US010918125B2

(12) United States Patent
Miller et al.

(10) Patent No.: US 10,918,125 B2
(45) Date of Patent: Feb. 16, 2021

(54) METHODS FOR FORMULATING DIETARY FOODSTUFFS

(71) Applicants: Commonwealth Scientific and Industrial Research Organisation, Acton (AU); Horticulture Innovation Australia Limited, North Sydney (AU)

(72) Inventors: Rosalind B. Miller, Urrbrae (AU); Louise Elizabeth Bennett, Caulfield South (AU); Sophie Ngoc Bich Selby-Pham, St. Kilda (AU)

(73) Assignees: Commonwealth Scientific and Industrial Research Organisation, Acton (AU); Horticulture Innovation Australia Limited, North Sydney (AU)

( * ) Notice: Subject to any disclaimer, the term of this patent is extended or adjusted under 35 U.S.C. 154(b) by 593 days.

(21) Appl. No.: 15/501,680

(22) PCT Filed: Aug. 3, 2015

(86) PCT No.: PCT/AU2015/000461
§ 371 (c)(1),
(2) Date: Feb. 3, 2017

(87) PCT Pub. No.: WO2016/019413
PCT Pub. Date: Feb. 11, 2016

(65) Prior Publication Data
US 2017/0215463 A1    Aug. 3, 2017

(30) Foreign Application Priority Data

Aug. 4, 2014    (AU) .............................. 2014903013

(51) Int. Cl.
*A61K 38/17*        (2006.01)
*A23L 33/105*       (2016.01)
(Continued)

(52) U.S. Cl.
CPC ............... *A23L 33/105* (2016.08); *A23L 5/30* (2016.08); *A23L 33/30* (2016.08); *G06N 7/00* (2013.01)

(58) Field of Classification Search
CPC .................................................... A23L 33/105
See application file for complete search history.

(56) References Cited

U.S. PATENT DOCUMENTS

| | | | |
|---|---|---|---|
| 5,922,361 A | 7/1999 | Bieser et al. | |
| 6,440,449 B1 * | 8/2002 | Hirschberg ............ | A23B 4/033 424/439 |
| 10,188,668 B2 * | 1/2019 | Bannister ............... | A61K 31/59 |

FOREIGN PATENT DOCUMENTS

| | | |
|---|---|---|
| JP | 2007519688 A | 7/2007 |
| JP | 2008526690 A | 7/2008 |

(Continued)

OTHER PUBLICATIONS

International Search Report and Written Opinion for International Patent Application No. PCT/AU2015/000461, dated Oct. 28, 2015 (9 pages).

(Continued)

*Primary Examiner* — Serkan Akar
*Assistant Examiner* — Ahmad Abdel-Rahman
(74) *Attorney, Agent, or Firm* — Brinks Gilson & Lione

(57) ABSTRACT

Generating an optimised formulation for a foodstuff, comprises receiving at a processor physicochemical data pertaining to one or more plant extracts and operating the processor to calculate a time, $T_{max}$, representing a time to reach a maximum concentration in plasma of at least one metabolite of the one or more plant extracts by applying the received physicochemical data to a mathematical model stored in memory. The processor is then operated to identify ones of the metabolites for which the calculated $T_{max}$ substantially corresponds with a target absorption time for (Continued)

the foodstuff; and to generate an optimised formulation for the foodstuff comprising the one or more plant extracts containing the identified metabolites. The physicochemical data include one or more of molecular mass (M), liphophilicity (log P) and Polar Surface Area (PSA).

17 Claims, 17 Drawing Sheets

(51) Int. Cl.
*A23L 33/00* (2016.01)
*A23L 5/30* (2016.01)
*G06N 7/00* (2006.01)

(56) References Cited

FOREIGN PATENT DOCUMENTS

| JP | 2010524055 A | 7/2010 |
|---|---|---|
| JP | 2013541108 A | 11/2013 |
| WO | 2005072738 A1 | 8/2005 |
| WO | 2006050939 A1 | 5/2006 |
| WO | 2006069422 A1 | 7/2006 |
| WO | 2008120105 A2 | 10/2008 |
| WO | 2012051591 A2 | 4/2012 |

OTHER PUBLICATIONS

Notification of Transmittal of International Preliminary Report on Patentability for International Application No. PCT/AU2015/000461, dated Jul. 11, 2016 (30 pages).

Alminger, M. et al., "In Vitro Models for Studying Secondary Plant Metabolite Digestion and Bioaccessibility," *Comprehensive Reviews in Food Science and Food Safety*, vol. 13, (2014) pp. 413-436.

Dokoumetzidis, A. et al., "Modelling and Simulation in Drug Absorption Processes," *Xenobiotica*, 37(10-11) (2007) pp. 1052-1065.

Fotaki, N. "Pros and Cons of Methods Used for the Prediction of Oral Drug Absorption," *Expert Rev. Clin. Pharmacol*, 2(22), (2009) pp. 195-208.

\* cited by examiner

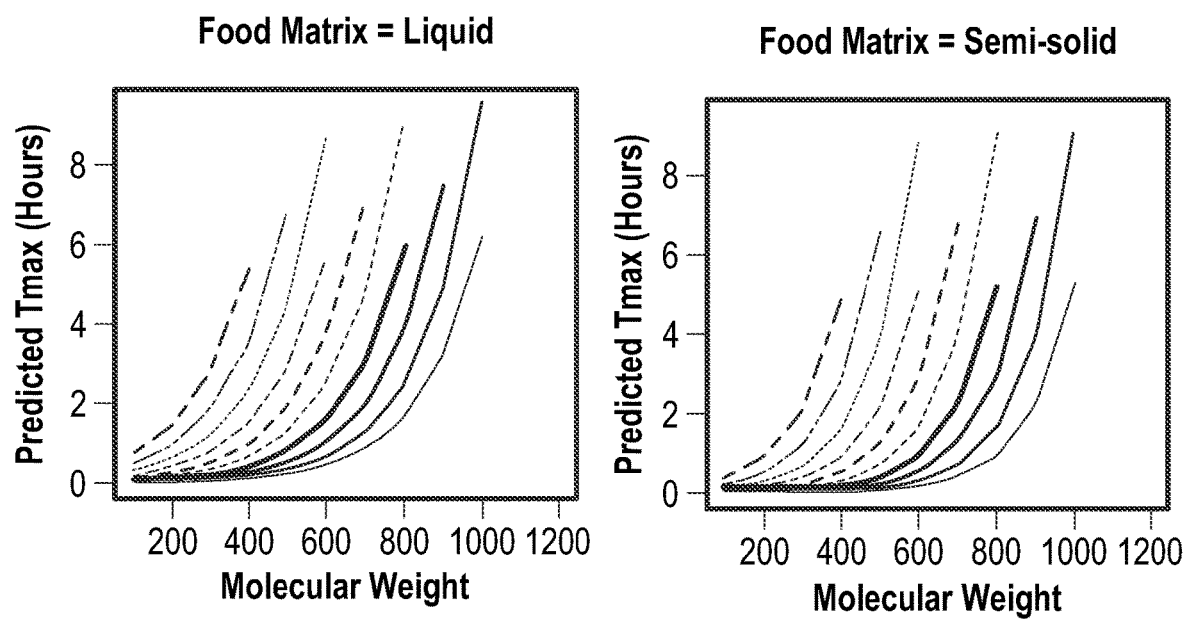
FIG. 8A
FIG. 8B
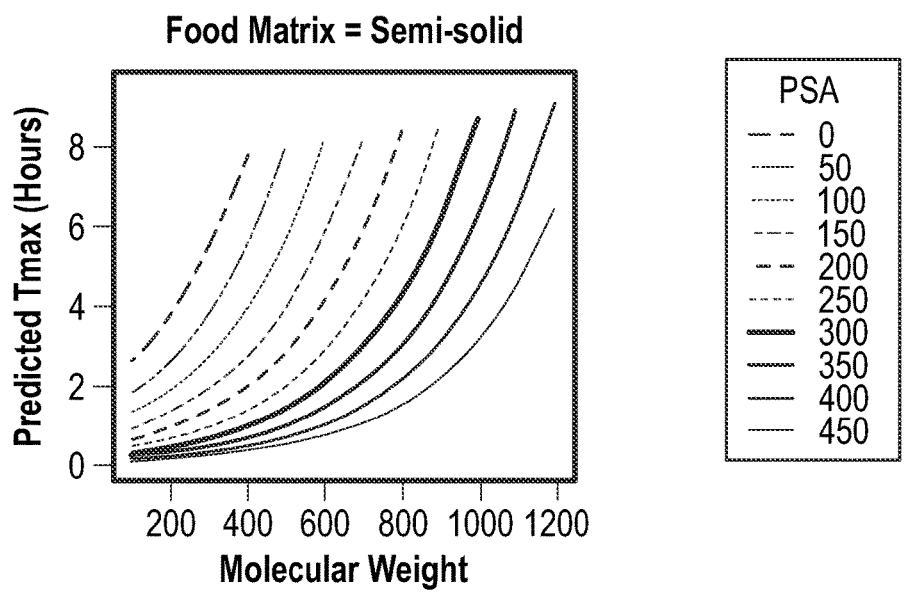
FIG. 8C
FIG. 8D

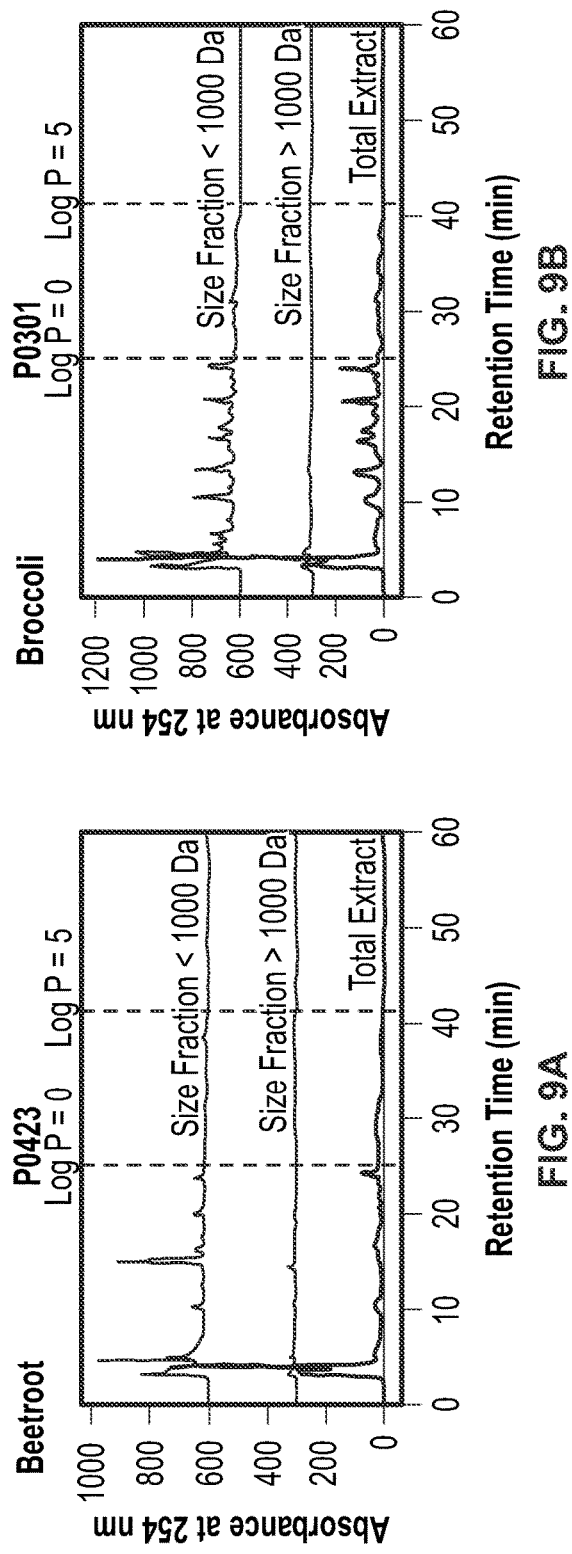
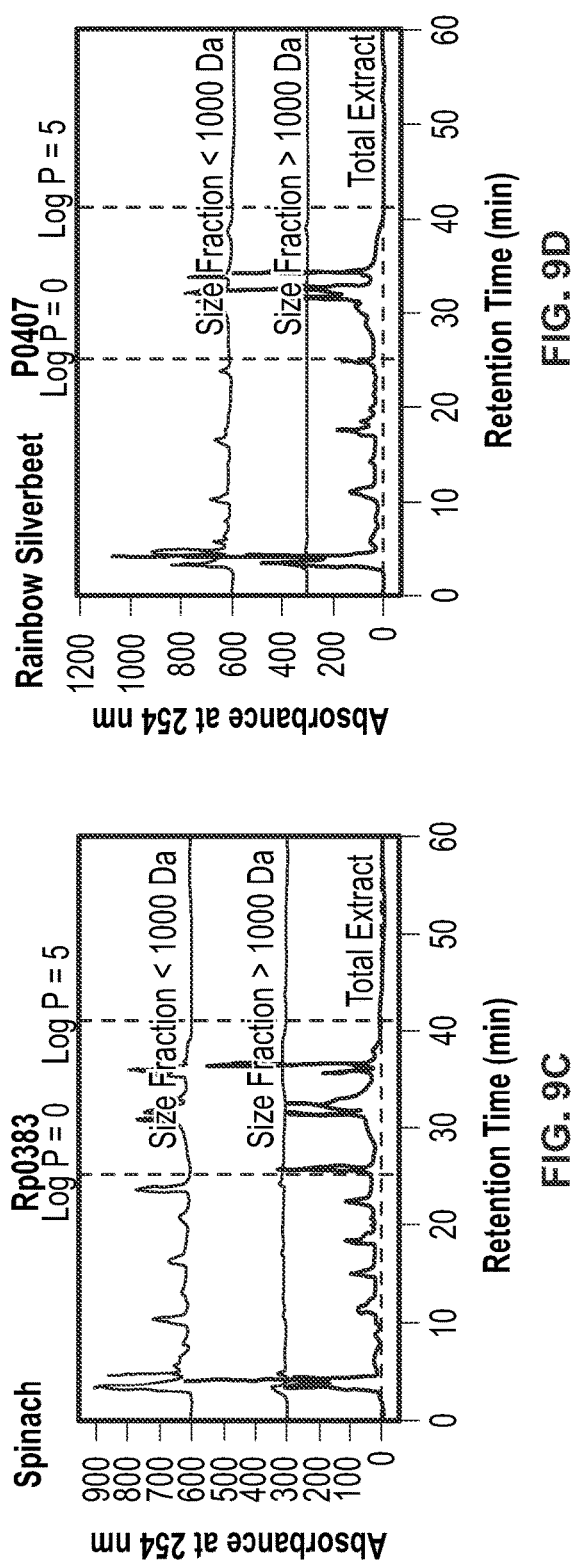

Table 1

| i | $\mu_i$ | $\beta_i$ | $\gamma_i$ | $\alpha_i$ |
|---|---|---|---|---|
| Liquid | -0.966 | 0.155 | 0.008 | 0.002 |
| Middle | -0.524 | -0.107 | 0.047 | 0 |
| Solid | 0.629 | -0.161 | 0.038 | 0 |

FIG. 17

Table 2

| i | $\mu_i$ | $\beta_i$ | $\gamma_i$ |
|---|---|---|---|
| Liquid | -0.959 | -0.009 | 0.007 |
| Middle | -1.831 | -0.011 | 0.009 |
| Solid | 0.590 | -0.007 | 0.004 |

FIG. 18

Table 3A: Liquid Matrix

|  | Estimated Range of Tmax (Hours) | | |
| --- | --- | --- | --- |
|  | LogP<0 | 0<LogP<5 | LogP>5 |
| M<1,000 Da | -0.0.3 to 3.1 | 0.6 to 9.5 | 1.7 to 29.5 |
| M>1,000 Da | 2.6 to 6.5 | 5.4 to 20.1 | 15.6 to 79.7 |

FIG. 19A

Table 3B: Semi-Solid Matrix

|  | Estimated Range of Tmax (Hours) | | |
| --- | --- | --- | --- |
|  | LogP≤0 | 0<LogP<5 | LogP>5 |
| M<700 Da | 3.3 to 0.6 | 0.6 to 1.1 | 1.7 to 21.7 |

FIG. 19B

Table 3C: Solid Matrix

|  | Estimated Range of Tmax (Hours) | | |
| --- | --- | --- | --- |
|  | LogP≤0 | 0<LogP<5 | LogP>5 |
| M<1,200 Da | 1.9 to 10.8 | 1.7 to 2.2 | 2.8 to 16.5 |

FIG. 19C

Table 4

| | Peak Area - P0423 (Beetroot) | | | Peak Area - P0301 (Broccoli) | | | Peak Area - RP0383 (Spinach) | | | Peak Area - P0407 (Rainbow Silverbeet) | | |
|---|---|---|---|---|---|---|---|---|---|---|---|---|
| | Total | Size>1000 Da | Size<1000 Da | Total | Size>1000 Da | Size<1000 Da | Total | Size>1000 Da | Size<1000 Da | Total | Size>1000 Da | Size<1000 Da |
| Log P<0 | 824.6 | 76.6 | 744.7 | 1622.2 | 164.9 | 1318.4 | 1106.6 | 150.7 | 739.1 | 718.5 | 53.4 | 545.9 |
| 0<Log P<5 | 114.6 | 12.1 | 57.3 | 104.2 | 14.5 | 158.6 | 856.1 | 57.9 | 428.9 | 514.6 | 35.3 | 321.8 |
| Log P>5 | 0.1 | 0.0 | 0.0 | 0.0 | 0.0 | 0.0 | 0.4 | 0.0 | 0.0 | 0.0 | 0.0 | 0.0 |
| | Percentage - P0423 (Beetroot) | | | Percentage - P0301 (Broccoli) | | | Percentage - RP0383 (Spinach) | | | Percentage - P0407 (Rainbow Silverbeet) | | |
| Log P<0 | | 9.3 | 90.3 | | 10.2 | 81.3 | | 13.6 | 66.8 | | 7.4 | 76.0 |
| 0<Log P<5 | | 10.5 | 50.0 | | 14.0 | 152.2 | | 6.8 | 50.1 | | 6.9 | 62.5 |
| Log P>5 | | | | | | | | | | | | |

FIG. 20

METHODS FOR FORMULATING DIETARY FOODSTUFFS

CROSS-REFERENCE TO RELATED APPLICATIONS

This application is a National Stage of International Application No. PCT/AU2015/000461 filed with the Australian Patent Office on Aug. 3, 2015, which claims priority to Australian patent application No. 2014/903,013 filed Aug. 4, 2014, wherein the entirety of each of the aforementioned applications is hereby incorporated herein by reference.

TECHNICAL FIELD

The present invention relates to use of plant extracts in the formulation of enriched foodstuffs such as dietary supplements, food additives and ingredients. It relates particularly, but not exclusively, to apparatus, systems and methods using mathematical models for estimating a time or time period at which plant metabolites reach maximum concentration in blood plasma, and using the estimated time or time period to optimise selection of plant extracts for inclusion in enriched foodstuffs.

BACKGROUND OF INVENTION

Diets rich in fruits and vegetables are known to be good for health. These foods play a role in prevention of chronic diseases such as cardiovascular diseases, diabetes and cancer. Phytochemicals in dietary plants are associated with reducing risk of these diseases in part due to their regulation of chronic inflammation. Inflammation cycles are also associated with normal processes such as post-meal digestion and exercise and are also amenable to the protective benefits of phytochemicals. However, current ad hoc uses of dietary plants fail to maximise their potential health benefits.

Maximising health benefits associated with dietary phytochemicals is predicated on achieving adequate circulating concentrations of bioactive species at the right time. Bioavailability is defined as the fraction of an ingested nutrient or compound that reaches the systemic circulation and the specific sites where it can exert its biological actions. That is, it refers to how much of the ingested quantity of the phytochemical is able to enter the plasma and perform its beneficial function in target tissue. The main factors affecting bioavailability include external factors (such as environment during plant growth, which influence natural abundance), food matrix (i.e. form of food consumed), food processing (e.g. thermal treatment, fermentation and homogenisation), interaction with other compounds in the lumen (e.g., fibre) and blood/blood plasma and chemical structure (including hydrophilicity, liphophilicity and structure and/or location of sugars).

The health protective properties of dietary phytochemicals are strongly related to their capacity to regulate inflammation and oxidative stress, which is evident as lowering biomarkers of inflammation. Analogously to the significance of LDL cholesterol in cardiovascular disease risk, biomarkers of inflammation have been widely used to monitor status and predict risk of chronic diseases or for measuring the responses to therapy. Results from 39 epidemiological studies and 42 clinical intervention studies show correlations between phytochemical intake and status of or change in, specific inflammation biomarkers i.e., positive, negative or no effect; similar numbers of studies reported a favourable lowering of the biomarker as those that reported no effect. A very minor proportion of studies reported a negative effect or elevation of any inflammatory biomarker.

Therefore, dietary phytochemicals have been observed to play a unique role in maintaining health and are rarely associated with adverse effects on health. However, the results also suggest that neither habitual nor targeted consumption of dietary phytochemicals as reflected by epidemiological and clinical studies, respectively, is optimised to produce a consistent effect or benefit.

Pharmacokinetics is the quantitative study of time course of absorption, distribution, metabolism and elimination ('ADME') of a compound in the human body and is widely used in drug discovery. In drug development, 'Lipinski's Rule of 5' is widely used to assess oral bioavailability of drugs. According to this Rule, a compound is likely to be membrane permeable and easily absorbed by the body if it satisfies selection criteria consisting of: (1) molecular weight less than 500; (2) Liphophilicity (i.e. octanol-water partition coefficient referred to as "Log P") less than 5; (3) number of hydrogen donors less than 5; and (4) number of hydrogen acceptors less than 10. However this approach to assessing oral bioavailability of new drugs does not lend itself to an approach for assessing bioavailability of phytochemicals in dietary plants because of the digestive pathways involved. This problem is exacerbated by heterogeneity of metabolites (i.e. they are mixtures, not single compounds) and the effects of intake format (or state of matter, solid or liquid) on digestion which until now, has been too difficult to predict to reliably assess bioavailability of phytochemicals.

The digestion pathway of phytochemicals following ingestion occurs in two main phases. In a first phase, digestion is through passive, receptor and enzyme-mediated processes operating in the upper intestinal wall. Compounds that are not absorbed in the small intestine due to their chemical properties are subjected to further metabolism in a second phase, by the colonic microflora in the lower intestine. Compounds progressing to lower gastro-intestinal absorption are more likely to be extensively modified and/or broken down by gut microflora into small metabolites that can be absorbed in the large intestine. The time for a phytochemical to reach a maximum concentration in plasma reflects absorption occurring via either upper (phase 1) or lower (phase 2) intestinal pathways and capacity to achieve a useful plasma peak is less likely following gut-mediated digestion.

It would be desirable to improve the efficiency with which dietary phytochemicals are consumed and/or to optimise the bioavailability of phytochemicals in foodstuffs, particularly to match the cycles of inflammation and oxidative stress associated with biological processes and chronic diseases. This could offer new opportunities for personalized nutrition targeting disease prevention for healthy populations and also benefiting those with inflammation-mediated chronic diseases.

The discussion of the background to the invention included herein including reference to documents, acts, materials, devices, articles and the like is included to explain the context of the present invention. This is not to be taken as an admission or a suggestion that any of the material referred to was published, known or part of the common general knowledge in Australia or in any other country as at the priority date of any of the claims.

SUMMARY OF INVENTION

Viewed from one aspect, the present invention provides a method for generating an optimised formulation for a foodstuff, comprising the steps of: receiving at a processor physicochemical data pertaining to one or more plant extracts; operating the processor to calculate a time, $T_{max}$, representing a time to reach a maximum concentration in plasma of at least one metabolite of the one or more plant extracts by applying the received physicochemical data to a mathematical model stored in memory; operating the processor to identify ones of the metabolites for which the calculated $T_{max}$ substantially corresponds with a target absorption time for the foodstuff; and operating the processor to generate an optimised formulation for the foodstuff comprising the one or more plant extracts containing the identified metabolites; wherein the physicochemical data include one or more of molecular mass (M), liphophilicity (log P) and Polar Surface Area (PSA).

The method may include calculating a plant extract proportion containing ones of the metabolites (i.e. multiple metabolites) for which the $T_{max}$ substantially corresponds with the target absorption time for the foodstuff. The plant extract proportion may be determined by identifying in the extract metabolites having similar physicochemical properties. For instance, when the mathematical model utilises M and Log P the plant extract proportion can include metabolites having similar molecular mass, e.g. those metabolites in the extract with M<700 Da. This proportion of the metabolites may be determined by fractionating the plant extract according to atomic mass. Ideally these plant extract proportions contain metabolites that are also within the range of Log P required to achieve the target absorption time. In other embodiments, such as where the model utilises M and PSA, the plant extract proportion is determined by identifying in the extract metabolites having similar PSA (and/or similar M). Thus, in some embodiments, the optimised formulation for the foodstuff comprises the calculated plant extract proportions for the one or more plant extracts. In some embodiments, the foodstuff consists of pure plant extracts (also referred to as phytochemicals) so that the foodstuff when consumed reaches maximum concentration in blood plasma at about the target absorption time.

Preferably, the method also includes the step of receiving at the processor a matrix type representing an intended composition of the foodstuff for consumption. The matrix type may be selected from a group including one or more of solid, semi-solid and liquid particularly when the foodstuff comprises pure plant extracts. However, other matrix types are contemplated e.g. where the pure plant extract is combined with other digestible ingredients giving rise to a foodstuff having matrix types including e.g. protein, carbohydrate fat and/or fibre.

In some embodiments, the method includes receiving at the processor a required target absorption time for the foodstuff. The target absorption time may be a specific time (e.g. number of hours from ingestion of the foodstuff) or it may be a time range (e.g. X to Y hours from ingestion). Similarly the calculated $T_{max}$ may represent a time value, or a time range, during which concentration in plasma of the at least one metabolite is estimated to be highest.

It is to be noted that the received physicochemical data may comprise of specific data values, or one or more ranges of data values.

In some embodiments, the target absorption time substantially corresponds with an inflammation cycle associated with one or more human disorders such as chronic disease, post-prandial inflammation, post-exercise inflammation, acute illness, genetic factors, environmental factors and toxin exposure to name a few. It is to be understood that this is a non-exhaustive list. In some embodiments, the formulation of the foodstuff is optimised for treatment of oxidative stress and may be optimised for treatment of an individual or group of individuals. Persons skilled in the art would appreciate that a target absorption time may be determined by reference to a disease indicator provided to the processor which has an associated time cycle stored in memory to which the absorption time is targeted.

Preferably, the mathematical model includes one or more parameters that adapt the mathematical model according to matrix type of the plant extracts in the foodstuff. Typically, there are two sets of parameters: (i) parameters for use when the physicochemical data includes PSA; and (ii) parameters for use when the physicochemical data includes log P.

In an embodiment where the received physicochemical data includes log P and M values, the mathematical model to calculate $T_{max}$ is:

$$\ln(T_{max})=\mu+\beta \log P+\gamma(\log P)^2+\alpha M \quad \text{(Equation 1)}$$

The parameters $\mu$, $\beta$, $\gamma$, and $\alpha$ are estimated using clinical evidence, i.e. experimental data of absorption kinetics for a range of pure plant metabolites. Where the received physicochemical data includes log P values, the parameters $\mu$, $\beta$, $\gamma$ and $\alpha$ may have values specific to plant extract matrix type i, e.g. according to the matrix type levels in Table 1.

In an embodiment where the received physicochemical data includes PSA and M values, the mathematical model is:

$$\ln(T_{max})=\mu+\beta PSA+\gamma M \quad \text{(Equation 2)}$$

In an embodiment where the received physicochemical data includes PSA and M values, the parameters $\mu$, $\beta$ and $\gamma$ may have values specific to plant extract matrix type i, according to the matrix type levels in Table 2.

Embodiments of the invention also relate to a method of making an enriched foodstuff including the steps of: providing edible plant material in a quantity consistent with the formulation generated in any one of the preceding claims; and combining the plant material with a carrier foodstuff to produce the enriched foodstuff.

Other aspects of the invention provide a meal accompaniment or dietary supplement for consumption post-exercise including the optimised foodstuff formulated according to the methods described above.

Viewed from another aspect, the present invention provides a method for estimating a rate of absorption of a metabolite from a foodstuff, comprising the steps of: receiving at a processor physicochemical data pertaining to the plant metabolite; and operating the processor to calculate a time, $T_{max}$, representing a time after ingestion of the foodstuff to reach a maximum concentration in plasma of the metabolite; the processor applying the received physicochemical data to a mathematical model stored in memory; wherein the physicochemical data include one or more of molecular mass (M), liphophilicity (log P) and Polar Surface Area (PSA), and the estimated rate of absorption is substantially equivalent to the calculated $T_{max}$.

Preferably, the metabolite is a plant metabolite although it is to be understood that the method has applicability for a range of digestible compounds from natural and synthetic sources including natural and synthetic plant extracts, synthetic polyphenolics and plant extracts that have been transformed into another state or otherwise modified during processing, cooking, stabilisation or the like.

In some aspects, the present invention may be utilised to calculate and employ values of $T_{max}$ for plant derived and non-plant derived foods such as amino acids, sugars and fatty acids that have been processed in such a way that they are not recognised by gut receptors and are therefore absorbed by passive processes like metabolites (phenolics) of plant extracts. Such processed foods include e.g. Advanced Glycation Endproducts (AGEs) which are a significant product of thermal processing of proteins and carbohydrates and are known to be pro-inflammatory. Once the $T_{max}$ for certain AGEs has been calculated using embodiments of the invention, it can be utilised to inform the characteristics of enriched formulations for foodstuffs or supplements that are optimised to counter or mitigate the inflammatory effects of AGEs that are associated with some processed foods. This is achieved as described below by optimising the enriched formulation to contain plant extracts with an objective absorption time, $T_{obj}$ that corresponds with the calculated $T_{max}$ of one or more AGEs.

Preferably, the estimating method includes receiving at the processor a matrix type (e.g. solid, semi-solid, liquid) representing the composition of an ingestible foodstuff containing the plant extract from which the metabolite is digested, and applying the matrix type to the mathematical model to ascertain the effect of food matrix on the estimated rate of absorption. The processor may apply the physicochemical data to a mathematical model according to the methods described above. Ideally, the foodstuff comprises pure plant extracts in solid, semi-solid or liquid matrix intake form to maximise accuracy of $T_{max}$. However, other matrix types are contemplated e.g. where the pure plant extract is combined with other digestible ingredients giving rise to a foodstuff having e.g. protein, carbohydrate, fat or fibre matrix.

In some embodiments, methods of estimating a rate of absorption of a metabolite as disclosed herein have utility in predicting the absorption performance of metabolites that have been modified e.g. by natural fermentation or by fermentation in a food or beverage production process. In other embodiments, such methods have utility in predicting the absorption performance of metabolites that have undergone hypothetical structural changes e.g. by substitution of sugars or other functional groups at one or more locations. M and one or both of PSA and Log P can be determined from the literature for the original metabolite and the hypothetical substitution, giving rise to a set of theoretical compounds for which Tmax can be determined using the inventive methods. This in turn can be used to produce a library of hypothetical compounds that can be utilised in the synthesis of compounds for consumption that selectively target specific absorption times.

Viewed from yet another aspect, the present invention provides a method for selection of one or more plant extracts that are suitable for inclusion in an optimised foodstuff, comprising the steps of: receiving at a processor an objective time, $T_{obj}$, for absorption of the dietary composition; operating the processor to apply the received $T_{obj}$ value to a mathematical model to identify values of one or more of molecular weight (M), liphophilicity (Log P) and polar surface area (PSA) which, when embodied in a metabolite, give rise to a time, $T_{max}$, at which the metabolite reaches maximum concentration in plasma, where $T_{max}$ is similar to $T_{obj}$; and operating the processor to: (i) interrogate a memory device storing physicochemical data and corresponding metabolites associated with a plurality of plant extracts, and (ii) select from the physicochemical data one or more associated plant extracts, or one or more metabolites of associated plant extracts, with physicochemical properties that are within a range of the identified values of one or more of M, Log P and PSA. The one or more selected plant extracts or selected metabolites of plant extracts are suitable for inclusion in the optimised foodstuff. The processor may apply the $T_{obj}$ value (or range of values) to a mathematical model as described in relation to the methods described above.

It is to be understood that the identified values for the molecular weight (M) and/or liphophilicity (Log P) and/or polar surface area (PSA) may be a discrete value or a range of values.

Embodiments of the invention may be used in a method for selecting a plant extract for inclusion in an optimised foodstuff comprising the steps of: for metabolites of a plurality of plant extracts, calculating $T_{max}$ according to the methods described above; ranking the metabolites according to the calculated $T_{max}$ values; and screening, selecting or quantifying the plant extracts according to the ranked $T_{max}$ values and a desired absorption time or absorption time range. Embodiments of the invention may be used by a system and/or apparatus to produce an optimised foodstuff incorporating the plant extracts and/or compounds selected according to the method.

Embodiments of the invention may also be used in a method of controlling the rate of absorption of a foodstuff, including the step of selecting for inclusion in the foodstuff one or more plant extracts having metabolites for which the calculated $T_{max}$ is in a range that satisfies a required rate of absorption.

Viewed from another aspect, the present invention provides a system for generating an optimised a formulation of a foodstuff, the system comprising: a physicochemical data module for receiving physicochemical data pertaining to one or more plant extracts; a memory module storing a mathematical model; an optimisation module configured to calculate a time, $T_{max}$, to reach a maximum concentration in plasma of at least one metabolite of the one or more plant extracts by applying the received physicochemical data to the stored mathematical model; a foodstuff formulation module configured to: (i) identify ones of the metabolites for which the calculated $T_{max}$ substantially corresponds with a target absorption time for the foodstuff; and (ii) generate an optimised formulation for the foodstuff comprising quantities of the one or more plant extracts containing the identified metabolites; and an output module configured to output the optimised formulation for use in preparation of the foodstuff.

The quantities may be determined by the foodstuff formulation module by calculating a proportion of one or more of the plant extracts, wherein the plant extract proportion comprises metabolites in the extract for which the $T_{max}$ substantially corresponds with the target absorption time for the foodstuff. This proportion may be determined by identifying in the extract multiple metabolites having similar physiochemical properties. For example, when the mathematical model utilises M and Log P, the plant extract proportion may correspond to those metabolites in the extract with M<700 Da. Ideally, these are within the range of Log P required to achieve the target absorption time. Thus, the optimised formulation for the foodstuff may comprise the calculated plant extract proportion for one or more plant extracts.

The system may be configured with modules, memory and processing means configured to perform steps to execute any one or more of the methods described above.

The system may further include technical features required for production of the foodstuff.

Another aspect of the present invention provides an apparatus for producing an enriched foodstuff, the apparatus including: a controller having a user interface for receiving an enrichment objective for the foodstuff being produced, the enrichment objective including at least a desired absorption time for the foodstuff; a plurality of storage chambers, each containing a plant extract and having an outflow opening operable by the controller to release a quantity of the plant extract for mixing; a blending chamber configured to receive plant extracts released from the storage chambers and having a mixer operable by the controller to mix the received plant extracts; and a processing unit for processing the mixed extracts into a format suitable for consumption or packaging as a foodstuff. The controller is in operative communication with a database containing physicochemical data for a range of plant metabolites and with a memory storing an algorithm for generating an optimised formulation for the foodstuff, the controller being configured to generate the optimised formulation comprising quantities of one or more of the plant extracts containing metabolites in proportions required to satisfy the enrichment objective of the foodstuff.

The algorithm for generating the optimised foodstuff ideally comprises steps according to the methods for generating an optimised foodstuff and for calculating a $T_{max}$ for metabolites of plant extracts as described herein.

In some embodiments, the user interface of the controller is configured to receive as a further enrichment objective one or more of foodstuff format, taste, texture, price and colour.

The storage chambers may comprise of storage chambers containing plant extracts in liquid format and storage chambers containing plant extracts in solid format. In some embodiments, the apparatus further includes one or more storage chambers containing carrier substances used by the processing unit to process the mixed extracts into a format for packaging, wherein the format is selected from a group including powder, solid, pill, capsule, gel, paste, and liquid.

In some embodiments, the apparatus includes a packaging unit for packaging the processed foodstuff.

Another aspect of the present invention provides computer program code useful to cause a computer processor to implement a method of generating an optimised formulation for a foodstuff, the computer processor being configured to: receive physicochemical data pertaining to one or more plant extracts, including one or more of molecular mass (M), liphophilicity (log P) and Polar Surface Area (PSA); calculate a time, $T_{max}$, to reach a maximum concentration in plasma of at least one metabolite of the one or more plant extracts by applying the received physicochemical data to a mathematical model stored in memory accessible by the computer processor; identify ones of the metabolites for which the calculated $T_{max}$ substantially corresponds with a target absorption time for the foodstuff; and generate an optimised formulation for the foodstuff comprising the one or more plant extracts containing the identified metabolites.

The computer program may configure the computer processor to calculate a proportion of the one or more plant extracts that contains ones of the metabolites for which the Tmax substantially corresponds with the target absorption time for the foodstuff, and to generate an optimised formulation comprising the one or more calculated plant extract proportions. The calculated plant extract proportion may be determined by identifying metabolites in the plant extract having one or more similar physicochemical properties.

The computer program code when executed, may be configured to implement on the computer processor one or more of the methods described above. The invention also provides a tangible computer readable medium including the computer program.

The present invention may also provide a method for predicting the efficacy of a foodstuff for treating a condition such as oxidative stress. The mathematical model may also be used to assess the clinical efficacy of traditional therapies, as well as the effect of foodstuff matrix on absorption time.

BRIEF DESCRIPTION OF DRAWINGS

The present invention will now be described in greater detail with reference to the accompanying drawings. It is to be understood that the embodiments shown are examples only and are not to be taken as limiting the scope of the invention as defined in the claims appended hereto.

FIGS. 8A, 8B and 8C are graphs representing values of $T_{max}$ calculated using the mathematical model in Equation 4, for a liquid matrix, a semi-solid matrix and a solid matrix respectively; and FIG. 8D represents the scale for PSA.

FIGS. 9A to 9D plot Log P values for different specific plant extracts (beetroot, broccoli, spinach and rainbow silverbeet respectively) that have been size fractionated.

FIG. 17 depicts Table 1 which represents values of the parameters for three matrix types for the mathematical model represented in Equation 3.

FIG. 18 depicts Table 2 which represents values of the parameters for three matrix types for the mathematical model represented in Equation 4.

FIGS. 19A, 19B and 19C depict Tables 3A, 3B and 3C, which represent the calculated range of $T_{max}$ (hours) for metabolites in Example 1 when consumed in the liquid, semi-solid and solid state, respectively.

FIG. 20 depicts Table 4 which is a numerical representation of the peak areas that are in the target Log P ranges for the Example, as represented graphically in FIG. 11.

DETAILED DESCRIPTION

Figure 1:
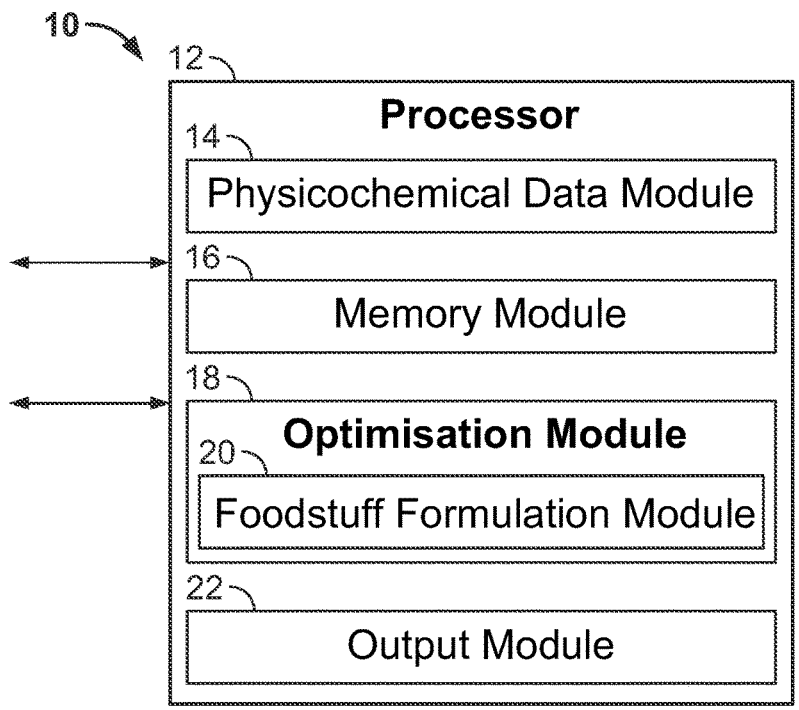
FIG. 1 is a schematic diagram of a system according to an embodiment of the invention.

Referring firstly to FIG. 1, there is provided a system 10 for generating an optimised formulation of a foodstuff. The system includes a processor 12 for implementing a number of modules that generate the optimised formulation. The modules include a physicochemical data module 14 configured to receive physicochemical data pertaining to one or more plant extracts and a memory module 16 storing one or more mathematical models which are used in the optimisation. An optimisation module 18 is configured to calculate a time, $T_{max}$, to reach a maximum concentration in plasma of at least one metabolite of the one or more plant extracts by applying the received physicochemical data to the stored mathematical model. The optimisation module 18 further includes a foodstuff formulation module 20. The foodstuff formulation module 20 is configured to identify ones of the metabolites for inclusion in the foodstuff and for which the calculated $T_{max}$ substantially corresponds with a target absorption time for the foodstuff.

In some embodiments, the foodstuff formulation module 20 also calculates a proportion of one or more plant extracts containing metabolites for inclusion in the foodstuff for which the calculated $T_{max}$ substantially corresponds with the target absorption time. The plant extract proportion is comprised of metabolites in the plant extract sharing similarity in at least one physiochemical property.

The foodstuff formulation module 20 also generates an optimised formulation for the foodstuff which comprises the one or more plant extracts containing the identified metabolites and optionally, the one or more calculated plant extract proportions. An output module 22 is configured to output data indicative of the optimised formulation for use in preparation of the foodstuff. Thus, the present invention may be used to inform plant selection for a foodstuff, based on metabolic performance.

Typically, the physicochemical data received at the physicochemical data module 14 includes one or more of molecular mass (M), log P (octanol-water partition coefficient being a measure of liphophilicity) and Polar Surface Area (PSA). The physicochemical data module 14 may be configured to receive the physicochemical data as absolute values or ranges of data values. It is to be understood, however, that other physicochemical data (and data affecting bioavailability of the metabolite) may be received at the physicochemical data module 14 which may influence the performance of the mathematical model to which the data are applied. The mathematical model stored in the memory module 16 may be modified to include additional variables and to estimate the coefficients of these additional variables that may be included in the model, to incorporate any additional physicochemical data. These may include, for example, number of freely rotatable bonds, pKa, number of H acceptors, number of H donors and the like although the inventors have determined that these additional physicochemical data are not significant factors influencing absorption time for plant extracts.

Figure 2:
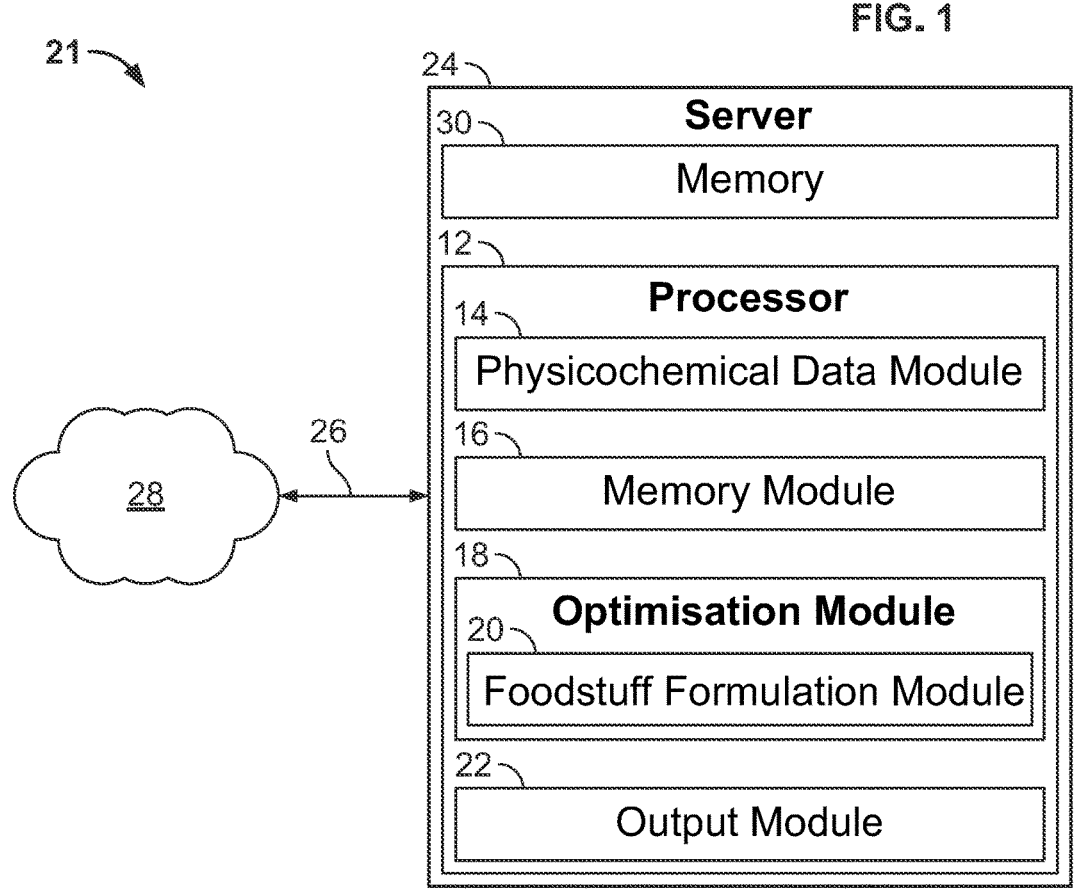
FIG. 2 is a schematic diagram showing a system according to another embodiment of the invention.

In another embodiment of a system 21 for generating an optimised formulation of a foodstuff (see FIG. 2), the processor 12 resides on a server 24 accessible over a network 28, such as the Internet, by a suitable data link 26. Accordingly, the server 24 receives and transmits data over the network 28 with any number of connected computing devices (not shown). The server 24 also includes a memory 30, in addition to the processor 12, for storing instructions to implement the modules to generate the optimised formulation. Thus, in the embodiment shown in FIG. 2, physicochemical data module 14 on the server 24 receives (or even may have stored thereon) physicochemical data pertaining to one or more plant extracts and optionally matrix type and other data influencing values of $T_{max}$ from, say, another server connected to the network 28.

Thus, food products may be developed by a number of different users connected to the network 28 by user devices and utilising the modules implemented on server 24 to optimise formulations of foodstuffs to match performance criteria influenced predominantly by a required target absorption time but also having the ability to take into account foodstuff matrix. The target absorption time may be provided to the server 24 by the user operating a user device connected to the network and received by the physicochemical data module 14 for processing. The server 24 remotely performs the necessary calculations and optimisation, based on the target absorption time, and delivers the generated optimised formulation from output module 22, over the network 28, to the user computer.

In some embodiments, physicochemical data module 14 receives an indicator of matrix type which represents an intended composition of the foodstuff for consumption. Typically, the matrix type is one of solid, semi-solid (e.g. a paste comprised of a combination of solid and liquid material) or liquid. Ideally, the foodstuff comprises pure plant extracts to maximise effectiveness when digested, particularly insofar as it relates to absorption time. However it is to be understood that the optimised foodstuff may be combined with other digestible ingredients such as protein, fat, carbohydrate and fibre giving rise to foodstuffs having other matrix types.

In some embodiments additional matrix types may be received by the physicochemical data module 14 to represent presence in the foodstuff of protein, carbohydrate fat and fibre which can affect rate of absorption of the metabolite. Thus, in some embodiments the mathematical model may include additional variables. The coefficients of these additional variables may represent the effect of additional matrix types on $T_{max}$ and/or the effect of food processing factors on $T_{max}$. Thus, food processing factors may also be received at the physicochemical data module 14. Food processing factors may include e.g. thermal treatment, fermentation, homogenization, liophylisation, cooking, methods of culinary preparation and storage. A range of other factors having the capacity to influence $T_{max}$ may be treated in the mathematical model, and as such, the physicochemical data module 14 may be configured to receive data corresponding to those factors for the relevant plant extracts or plant extract metabolites.

The target absorption time may be stored in memory module 16 and may be associated, e.g. with particular inflammatory cycles or diseases for which the optimised foodstuff is being formulated to treat. However in some embodiments, optimisation module 18 is further configured to receive a required target absorption time for the foodstuff. The target absorption time may be a specific time calculated in hours or minutes (or, in some instances, days etc.), or it may be an indicator of a rate of time, such as fast, medium or slow. By way of non-limiting example, fast may designate a target absorption time less than 2 hours (e.g. 15 mins, 30 mins, 45 mins, 60 mins, 75 mins, 90 mins or 105 mins), slow may designate a target absorption time more than 6 hours (e.g. 7, 8, 9, 10, 11 or 12 hours), and medium may designate a target absorption time between 2 and 6 hours (e.g. 2.5, 3, 3.5, 4, 4.5, 5 or 5.5 hours). In other embodiments, target absorption time is represented as a time range where e.g. absorption is desired 1 to 2 hours after ingestion or e.g. from 6 to 8 hours after ingestion. $T_{max}$ is a useful indicator of where in the body the metabolite is likely to be absorbed. For example, $T_{max}$ from 1 to 2 hr (fast absorption—see above) is indicative of absorption in the small intestine while $T_{max}$ greater than 2 hr implies slower rate of absorption (see above) in the upper intestine. $T_{max}$ from 12 to 24 hr suggests that the absorption occurs in the colon and may produce concentrations of metabolites in plasma that produce a very shallow, possibly imperceptible 'peak'. Target absorption times for intervention of oxidative stress may be e.g. less than 2 hrs for post-exercise; 4 to 6 hrs for post-prandial and longer than 6 hours for gut microbiome-mediated absorption. The latter may give rise to metabolism (as opposed to passive absorption) of smaller metabolites with longer systemic (and potentially brain) bioavailability.

Thus, a received required target absorption time or "rate of absorption" can be used to designate whether the foodstuff being formulated is required to include plant extracts having metabolites readily digested e.g. in the small intestine or in the upper intestinal tract, or metabolised in the colon. In some embodiments, the target absorption time substantially corresponds with an inflammation cycle that is known or suspected to be associated with one or more of e.g. a chronic disease, post-prandial inflammation, post-exercise inflammation, acute illness, genetic factors, environmental factors and toxin exposure. In some embodiments, the formulation of the foodstuff is optimised for treatment of oxidative stress and may be tailored to an individual or to a cohort of individuals based on rate of absorption objectives defined for the individual, or for a cohort of individuals. In some cases, the mathematical model may be tuned to the individual or cohort of individuals using experimental pharmacokinetic data obtained from that individual or cohort of individuals.

Figure 3:
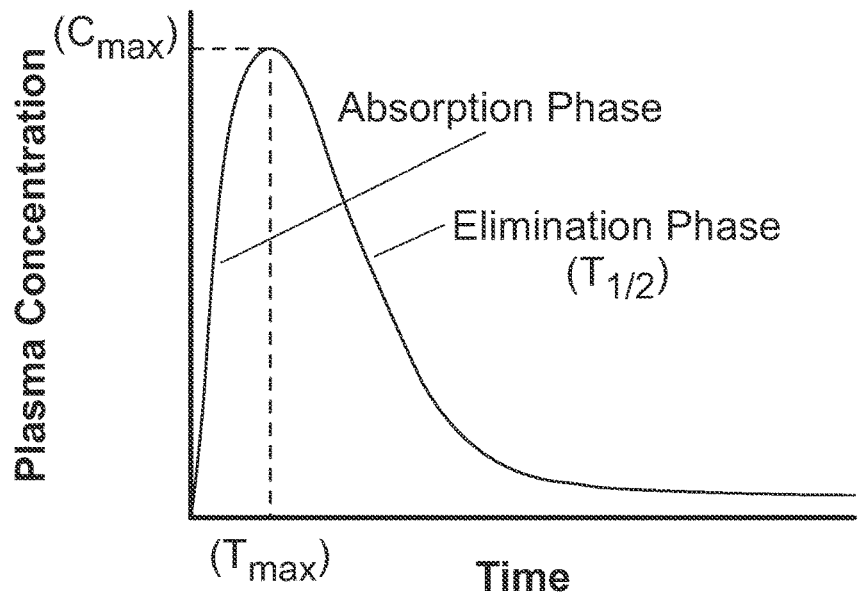
FIG. 3 is a typical plasma concentration-time profile of a plant metabolite of a plant extract after oral administration.

In some embodiments, the $T_{max}$ calculated by optimisation module 18 comprises a specific time at which concentration in blood plasma of the at least one metabolite is estimated to be highest. This is illustrated in FIG. 3. However, in other embodiments, $T_{max}$ is calculated as a range of times $T_1:T_2$ during which concentration in blood plasma of the at least one metabolite is estimated to be sufficiently high to treat inflammation.

$T_{max}$ values from clinical evidence of the pharmacokinetic behaviour of plant metabolites for which the physicochemical data were known, were used to develop the mathematical models which are configured to calculate an estimate of the time taken ($T_{max}$) to reach a maximum concentration in plasma of a plant metabolite (i.e. antioxidants) using specific measurable physicochemical properties. These models represent predictive tools intended for development of biologically efficacious products and e.g. nutritional medicines, based on dietary plant metabolites. The mathematical models have a range of specific applications that include 'sorting' or prioritization of plant extracts into proportions that absorb e.g. in the upper versus lower intestine, and in the formulation of foodstuffs for which the rate of absorption can be controlled. If desired, the rate of absorption of the formulation can be matched, based on physicochemical properties of the extracts, to target biological processes such as acute or chronic cycles of oxidative stress and inflammation. The inventive systems used to generate these formulations may also take into account the effect of foodstuff matrix type and density on rate of absorption.

Two mathematical models have been developed for use in aspects of the invention although combination of the models into a single model is not precluded. The first mathematical model estimates $T_{max}$ from the physicochemical parameters: liphophilicity index (Log P) and Molecular Mass (M) and is shown as Equation 1.

$$\ln(T_{max}) = \mu + \beta \log P + \gamma (\log P)^2 + \alpha M \quad \text{(Equation 1)}$$

In Equation 1, $\mu$, $\beta$, $\gamma$ and $\alpha$ are parameters of this mathematical model and are estimated using experimental data.

The second mathematical model estimates $T_{max}$ from the physicochemical parameters of Polar Surface Area (PSA) and Molecular Mass (M) and is shown as Equation 2.

$$\ln(T_{max}) = \mu + \beta(PSA) + \gamma M \quad \text{(Equation 2)}$$

In Equation 2, $\mu$, $\beta$, $\gamma$ and $\alpha$ are parameters of this mathematical model and are estimated using experimental data.

The mathematical models have been developed in such a way that they can also account for the effects of food matrix on $T_{max}$; the models can be used to estimate a value or range of values of $T_{max}$ for foodstuffs consisting of plant extracts formulated in solid, semi-solid (mixed) or liquid matrices, ideally in a substantially pure form. Typically, the "solid" matrix format corresponds to a pill or other hard format ingestible foodstuff. The mathematical models in Equations 1 and 2 have been modified to account for matrix type in the mathematical models in Equations 3 and 4, where i represents the matrix type.

$$\ln(T_{max})_i = \mu_i + \beta_i \log P + \gamma_i (\log P)^2 + \alpha_i M \quad \text{(Equation 3)}$$

In Equation 3, the parameter $\mu_i$ is a constant, and the parameters $\beta_i$, $\gamma_i$ and $\alpha_i$ denote the coefficient for Log P, (Log P)$^2$ and M respectively. In an embodiment, the values of the Equation 3 parameters, for the three matrix types, are identified in Table 1.

$$\ln(T_{max})_i = \mu_i + \beta_i(PSA) + \gamma_i M \quad \text{(Equation 4)}$$

In Equation 4, the parameter $\mu_i$ is also a constant, and the parameters $\beta_i$ and $\gamma_i$ denote the coefficient for PSA and M respectively. In an embodiment, the values of the Equation 4 parameters, for the three matrix types, are identified in Table 2.

It is to be understood that further optimisation and refinement of the mathematical models may lead to estimates of different (improved) parameter values and possibly more parameter estimates to accommodate for further matrix types (e.g. containing protein, fat and fibre).

Figure 4:
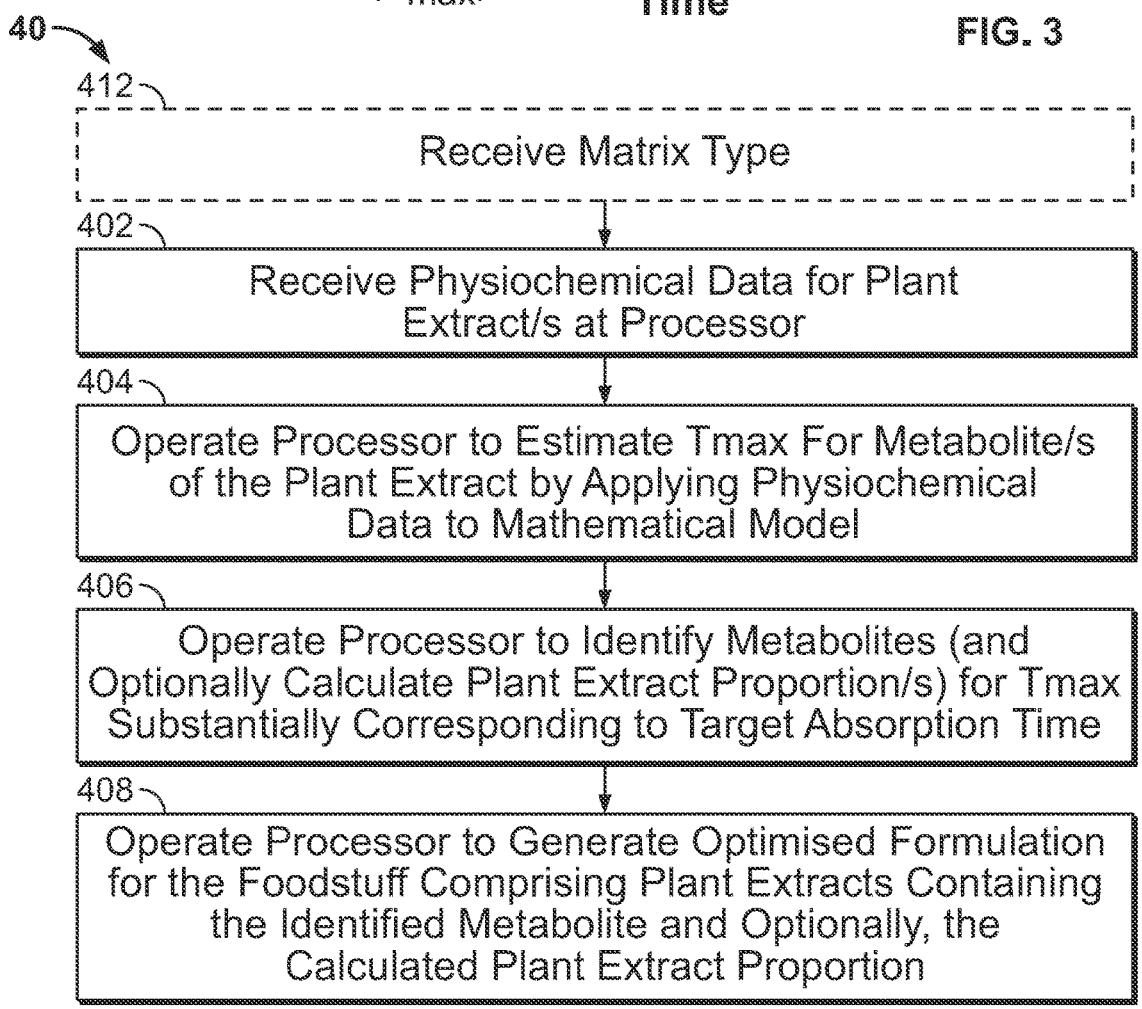
FIG. 4 is a flow diagram of a method according to an embodiment of the invention.

Turning now to FIG. 4, there is shown a flow chart representing a method 40 for generating an optimised formulation of a foodstuff. The method includes in step 402 receiving at a processor physicochemical data pertaining to one or more plant extracts and in a step 404 operating the processor to calculate a time, $T_{max}$, to reach a maximum concentration in plasma of at least one metabolite of the one or more plant extracts. This is achieved by applying the received physicochemical data to a mathematical model stored in memory accessible by the processor. Typically, the mathematical model is selected from one of the models discussed herein, e.g. in relation to Equations 1 to 4, according to which of the physicochemical data are received at the processor and optionally, matrix type. The mathematical models represented in Equations 1 and 3 require data for molecular mass (M) and liphophilicity (log P) of the metabolite, whereas the mathematical models represented in Equations 2 and 4 require data for molecular mass (M) and Polar Surface Area (PSA).

It is to be noted, however, that for the model of Equation 3, the liquid matrix is the only type that requires physicochemical data for Log P and M in order to calculate $T_{max}$. For the semi-solid and solid matrices $T_{max}$ is determined by Log P only since the parameter a during development of the model for the semi-solid and solid matrices was estimated to have a value that is not significantly different from zero and so in Table 1 has been attributed a value of zero.

Figure 7A:
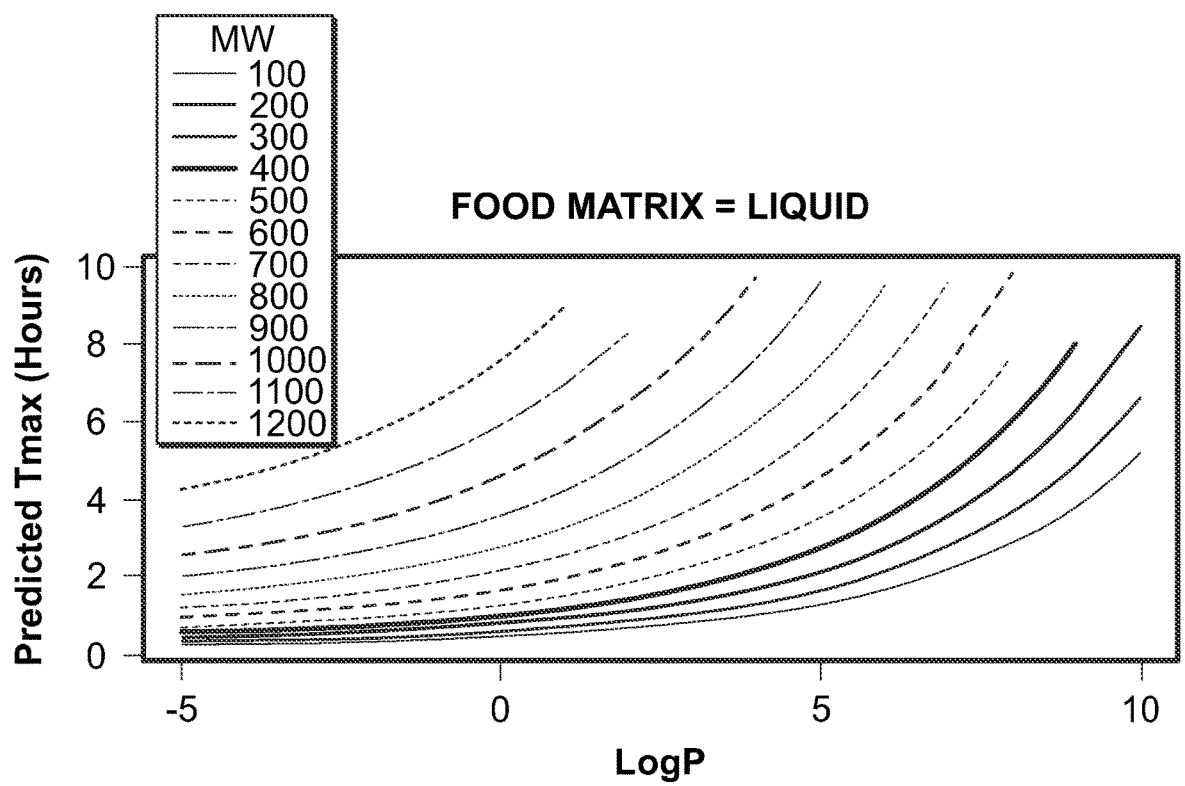
FIG. 7A is a graph representing values of $T_{max}$ calculated using the mathematical model in Equation 3, for a liquid matrix.
Figure 7B:
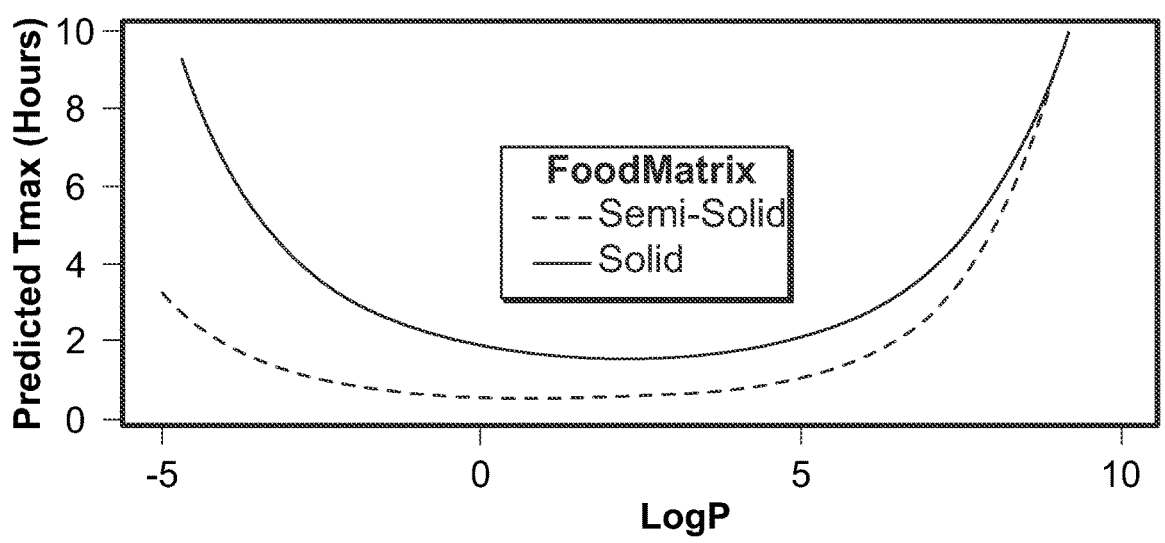
FIG. 7B is a graph representing values of $T_{max}$ calculated using the mathematical model in Equation 3, for solid and semi-solid matrices.

FIG. 7A is a graph representing values of $T_{max}$ calculated using the mathematical model in Equation 3 for a liquid matrix. FIG. 7B is a graph representing values of $T_{max}$ calculated using the mathematical model in Equation 3 for solid and semi-solid matrices. From these figures, it can be seen that M affects $T_{max}$ for a liquid matrix, for which $T_{max}$ increases with increasing values of Log P. In contrast, for solids and semi-solids (FIG. 7B), the effect of Log P on $T_{max}$ is independent of M. Here, for 0<Log P<5 $T_{max}$ is shorter indicating fast absorption whereas $T_{max}$ is longer for values of Log P<0 and also for values of Log P>5.

The mathematical model represented in Equation 3 as it applies to semi-solid and solid matrices is U-shape compared with the model as it applies to liquids. Thus, absorption rates for metabolites with Log P<0 (i.e. higher water solubility) are significantly lengthened for semi-solid and solid matrix forms but are very short for mid ranges of Log P. This is the opposite behaviour for $T_{max}$ to what is observed for the liquid matrix. Estimates of $T_{max}$ are again lengthened for semi-solid and solid matrix forms for high Log P values.

The present invention has the ability to take into account these behaviours when estimating the absorption characteristics of certain plant extracts. The ability to calculate estimated absorption times and so, predict time frames for bioavailability of phytochemicals in the blood stream after ingestion of certain foodstuffs containing certain plant extracts in certain matrix formats provides an advantage over prior art techniques used in food and nutritional product development.

FIGS. 8A to 8C represent values of $T_{max}$ calculated using the mathematical model in Equation 4, for liquid, semi-solid and solid matrices respectively and for a range of values for Molecular Weight (M) and PSA for which the scale is shown in FIG. 8D. The mathematical model represented by Equation 4 demonstrates inverse relationships when compared with the Equation 3 model. The $T_{max}$ values depend on M and PSA, and the range of values are not U-shaped.

It is to be noted, that the mathematical model and the values in Table 2 used to generate the graphs of FIGS. 8A to 8C (and indeed the values in Table 1 used to generate the graphs of FIGS. 7A and 7B) were estimated using experimental data from a limited range of values of M and PSA. Accordingly, the inventors envisage that although the mathematical models may validly apply over a broad range of values for the relevant physicochemical data, it is more likely that the accuracy of the models disclosed herein is optimised e.g. for M<1200 Da for solid matrices; for M<700 Da for semi-solid matrices and for M<600 Da for liquid matrices.

In a step 406 the method includes operating the processor to identify metabolites (and optionally, to calculate plant extract proportion/s) for which the calculated $T_{max}$ substantially corresponds with a target absorption time for the foodstuff. Further, the method includes in a step 408 operating the processor to generate an optimised formulation for the foodstuff comprising the one or more plant extracts containing the identified metabolites and optionally, the calculated plant extract proportions.

Figure 5:
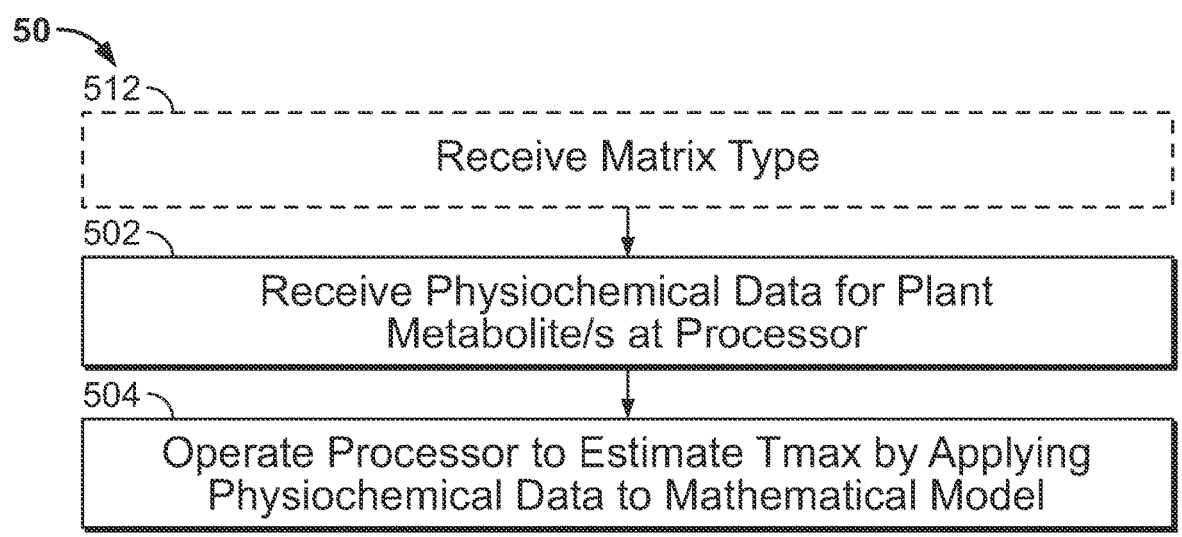
FIG. 5 is a flow diagram of a method according to another embodiment of the invention.

Turning now to FIG. 5, there is shown a flow chart representing a method 50 for predicting a rate of absorption of a plant metabolite. The method includes, in step 502 receiving at a processor physicochemical data pertaining to the plant metabolite and in a step 504 operating the processor to calculate a time, $T_{max}$, to reach a maximum concentration in plasma of the metabolite. This is achieved by applying the received physicochemical data to a mathematical model stored in memory accessible by the processor. Typically, the mathematical model is selected from one of the models discussed herein, e.g. in relation to Equations 1 to 4, according to which of the physicochemical data are received at the processor, and matrix type. The output of this method is one or more values of $T_{max}$ as calculated for the one or more plant metabolites.

As would be appreciated by those skilled in the art, the methods in FIGS. 4 and 5 may be modified by, prior to operating the processor at step 404 or 504, further receiving, in a step 412, 512, a matrix type representing an intended composition of the foodstuff for consumption. As described elsewhere, the matrix type is typically selected from a group including one or more of solid, semi-solid and liquid and is used to select parameters applied to the mathematical model (see Equations 3 and 4) to take into account the effect of food matrix on the predicted rate of absorption.

Figure 6:
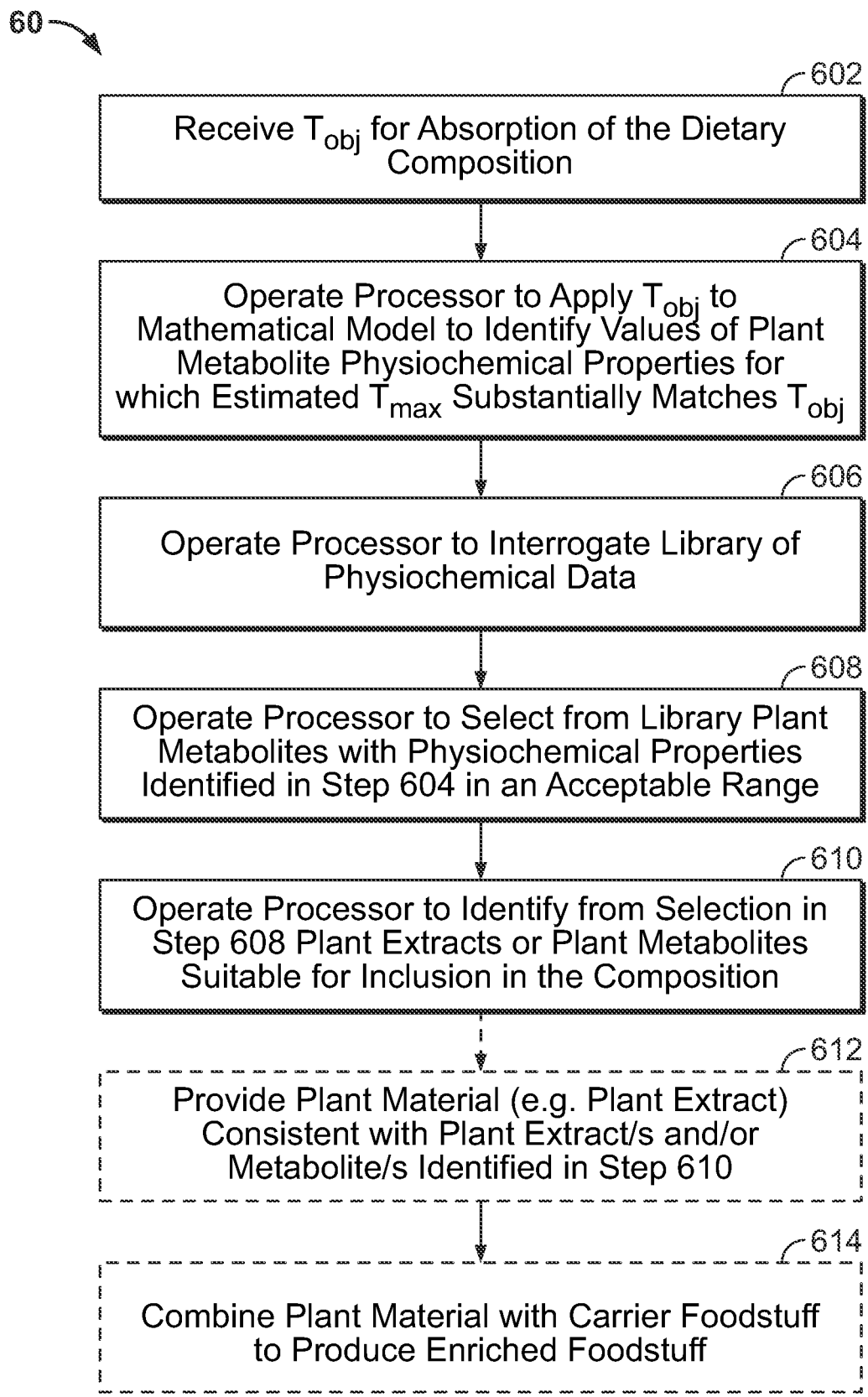
FIG. 6 is a flow diagram of a method according to yet another embodiment of the invention.

Referring now to FIG. 6, there is shown a method 60 for identifying one or more plant extracts suitable for inclusion in an optimised foodstuff. The method includes, in a step 602, receiving at a processor an objective time, $T_{obj}$, for absorption of the dietary composition and operating the processor at a step 604 to apply the received $T_{obj}$ value to a mathematical model to identify values of one or more of molecular weight (M), liphophilicity (Log P) and polar surface area (PSA) which, when embodied in a plant metabolite, give rise to a time, $T_{max}$, at which the metabolite reaches maximum concentration in plasma, where $T_{max}$ is similar to $T_{obj}$. Further, the method includes in a step 606 operating the processor to interrogate a memory device storing a library of physicochemical data for metabolites associated with a plurality of plant extracts, and in a step 608, selecting from the library one or more plant extracts, or one or more metabolites of plant extracts, with physicochemical properties that are within a range of the identified values of M, Log P and PSA. The method also includes in step 610, identifying in the one or more selected plant extracts or selected metabolites from step 608, plant extracts suitable for inclusion in the optimised foodstuff. As would be understood by one of skill in the art, the method of FIG. 6 utilises the mathematical models discussed herein and is adapted, in some embodiments, to account for matrix, in the method of selection.

In some embodiments, the methods of FIGS. 4 to 6 may also be used in a method of making an enriched foodstuff. In any of these cases (but illustrated only in relation to FIG. 6), in a step 612 a plant material (e.g. an extract) is provided which is consistent with the formulation or identification determined according to one of the methods illustrated, and in a step 614, is combined with a carrier foodstuff to produce the enriched foodstuff.

The method of FIG. 6 may also be used in a method of selecting a plant extract for inclusion in an optimised foodstuff by estimating a $T_{max}$ for metabolites of each of a plurality of plant extracts, ranking the metabolites according to $T_{max}$ value or range, and screening, selecting or quantifying the plant extracts according to the ranked $T_{max}$ values/ranges and a desired absorption time or absorption time range for the optimised foodstuff.

Figure 12:
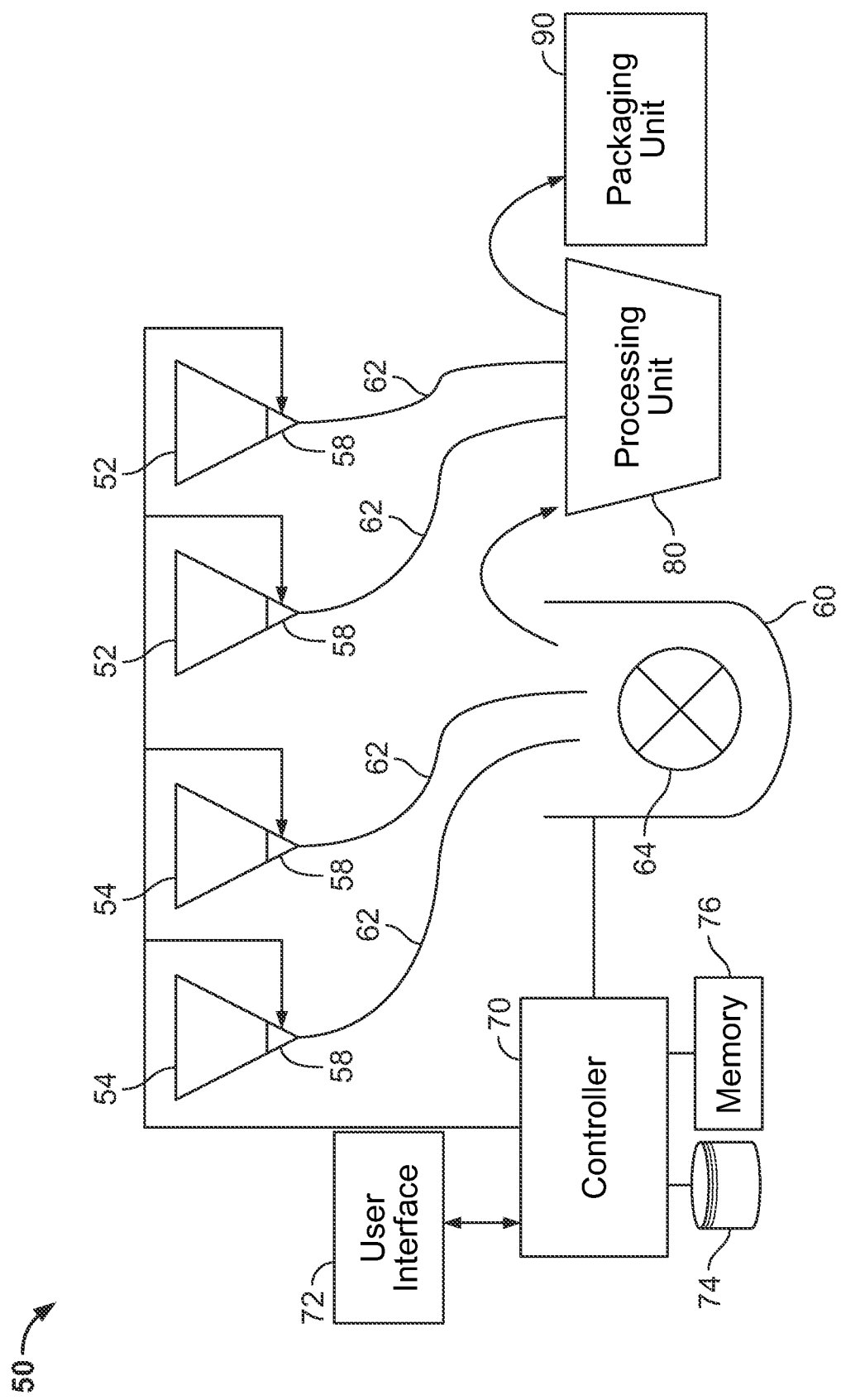
FIG. 12 is a schematic illustration of an apparatus for production of an enriched foodstuff according to an embodiment of the invention.

Turning now to FIG. 12, there is shown apparatus 50 for producing an enriched foodstuff. A controller 70 is in operative communication with a plurality of chambers 54 each containing a plant extract and having an outflow opening 58 operable by the controller to release a quantity of the plant extract for mixing. The storage chambers 54 may contain liquid plant extracts or solid plant extracts. Alternatively, the storage chambers 54 may be supplied by an extractor 56 which produces an extract from a plant material for supply to the apparatus. This may particularly appropriate for commercial apparatus.

Plant extracts can be prepared by standard food processing technologies for separating soluble species from insoluble matrices that may involve assisted methods, e.g. microwave, solvent, sonication, carbon-dioxide, high-pressure and combinations of these methods as would be known to one of skill in the art. A food-compatible or other appropriate extraction method can be applied to a plant material or foodstuff to release a plant extract containing plant metabolites in a target range of Log P and target absorption time, $T_{max}$. Food processing technologies used for molecular fractionation including membrane filtration, chromatographic separation, enzyme, fermentation processing can be used to enrich in the target fraction and other technologies can be used for concentration and drying if the target product is a powder.

A blending chamber 60 receives quantities of plant extract released from the storage containers 54 via tubes 62 and includes a mixer 64 operable by the controller 70 to mix the received plant extracts.

Controller 70 has user interface 72 for receiving an enrichment objective for the foodstuff being produced. The enrichment objective includes at least a desired absorption time $T_{obj}$ for the foodstuff, representing a desired time after ingestion at which a metabolite of the foodstuff will reach maximum concentration in blood plasma of the consumer. Other enrichment objectives may include one or more of foodstuff format (e.g. powder, solid, pill, capsule, gel, paste, and liquid), taste, texture, price and colour and shelf life as well as the quantity of the foodstuff to be produced. In some embodiments, the foodstuff is a substantially pure plant extract or combination of substantially pure plant extracts in solid, semi-solid or liquid form.

A processing unit 80 processes the mixed extracts into a format suitable for packaging as a foodstuff. The format may be e.g., a powder, solid, pill, capsule, gel, paste, and liquid. If the desired foodstuff format is a liquid then mixed liquid extracts can be directly processed and packaged in that format; if the desired foodstuff format is a powder then mixed powder extracts can be directly processed and packaged in that format in each case. Any foodstuff format requires food-grade manufacturing quality ensuring microbiological safety and required shelf stability.

Where the enrichment objective received at user interface 72 includes a foodstuff format, the processing unit 80 processes the foodstuff into the desired format. The processing unit 80 is under the control of controller 70 which also operates an outflow opening 58 of one or more storage chambers 52 containing carrier substances used by the processing unit to process the mixed extracts into the desired format. The storage chambers 52 may include one e.g. edible oil, water or other excipients with which the mixed plant extracts are processed before packaging. Carrier substances are conveyed to the processing unit 80 by tubes 62.

In embodiments where the apparatus 50 is provided for personal, private or small scale use, the processed foodstuff may be provided ready for consumption in the home, workplace, hospital, gym or other environment where it is supplied by the apparatus immediately to the consumer. In other embodiments, the apparatus 50 is provided for commercial scale production and includes a packaging unit 90 that packages the foodstuff for distribution and sale. The packaging unit 90 packages the processed foodstuff appropriately for the foodstuff format. Thus, packaging unit 90 may be configured to package powders into containers, jars, bottles or sachets, to package solids into packets or bars, to package capsules or tablets into blister packs, bottles, jars or containers, to package gels into tubes or sachets, to package pastes into tubes or sachets, and to package liquids into bottles, jars, ampoules or vials.

Controller 70 is in operative communication with a database 74 containing physicochemical data for a variety of plant metabolites and with a memory 76 storing an algorithm for generating an optimised formulation for the foodstuff. Controller 70 is configured to generate the optimised formulation comprising quantities of one or more of the plant extracts containing metabolites in proportions required to satisfy the enrichment objectives of the foodstuff, and to operate the apparatus to produce the enriched foodstuff accordingly.

Controller 70 is adapted to interrogate database 74 to ascertain a 'fingerprint' of plant extracts stored comprising a $T_{max}$ value calculated according to methods described herein together with associated physicochemical data for metabolites of the extracts. That is, controller 70 interrogates database 74 and applies data from the database to a mathematical model (according to Equation 3 or Equation 4) stored in memory 76 to develop optimised formulations for the enriched foodstuff according to the enrichment objectives that are specified by an operator for targeted biological functionality. The mathematical model is selected by the controller 70 according to available physicochemical data in database 74 and the desired foodstuff format. For example, the Equation 3 model may be applied for semi-solid or solid foodstuff matrices ideally comprising substantially pure plant extracts, where Log P and M are available for metabolites in the plant extracts; Equation 4 may be applied for any format comprising substantially pure plant extracts where PSA and M are available for metabolites in the extract.

Individual plant extracts can be screened automatically by the controller 70 and 'fingerprint' properties inform selection by the controller of a plant extract per se or strategic blending of multiple extracts, to achieve either short- or sustained-acting formulations that met the enrichment objectives. $T_{max}$ values for plant extracts in the formulation typically define a band or window of time at which the formulation is expected to reach maximum concentration in plasma. Narrow $T_{max}$ versus broad $T_{max}$ formulations are expected to be useful for regulating acute or chronic cycles of inflammation, respectively. It does not matter that a formulation may contain a broader $T_{max}$ than required for the enrichment objective but that it contains adequate proportions of metabolites required to achieve at least the target $T_{max}$ range. Thus, a particular formulation may be suitable for both narrow and broad $T_{max}$ health applications. Likewise, a particular formulation can display different properties if ingested in solid versus liquid form.

Embodiments of the invention may also be used in a method of controlling the rate of absorption of a foodstuff which includes the steps of selecting for inclusion in the foodstuff one or more plant extracts having a metabolite for which the calculated $T_{max}$ is in a range that satisfies a required rate of absorption, wherein the plant extract is selected according to the methods described above.

Further aspects of the methods of the invention will be apparent from the above description of the systems 10, 21. Persons skilled in the art will appreciate that the methods may be embodied in program code, executed by a processor which could be supplied in any of a number of ways, for example on a non-transient computer readable medium such as a disc or mobile memory device, which may be accessed directly by the processor or accessed by the processor using data signals transmitted e.g. from a remotely located server.

The present invention provides various advantages over existing approaches to developing improved foodstuffs which typically involve experimentation and time consuming trials in which 'enriched' foods are developed and tested on a consumer segment for efficacy and adverse effects before being perfected for production on larger scales. The present invention provides a viable alternative to this process, in which the inventive methods and mathematical models are used to predict the effectiveness of a foodstuff based on a selection made according to a calculated $T_{max}$ value which indicates the expected absorption time, and to facilitate production of improved or enriched foodstuffs. This has the capacity to improve the efficiency and efficacy of the growing supplement and enriched food production industry by reducing the time and cost involved with developing new enriched foodstuffs and supplements significantly.

In drug development, therapeutic compounds that are not absorbed in the upper intestine are not useful and typically require re-design. However, this is not the case for dietary plant metabolites as the compounds excluded from upper intestinal absorption that are not eliminated may be absorbed via microbiota-mediated metabolic processes in the lower intestine, with different metabolites formed and potentially presenting different modes of bioactivity. The present invention can be utilised to 'sort' or preferentially select plant extracts (or groups of plants—with single or mixtures of metabolites) into fractions that absorb in the upper versus lower intestine based on calculated $T_{max}$ values or ranges of values. This, in turn, can be used to develop foodstuffs for which the expected absorption time or time profile when consumed substantially matches cycles of biological processes leading to inflammation. For example, a foodstuff may be optimised to contain a mixture of three plant extracts that combine low, medium and high $T_{max}$ characteristics to match the inflammatory cycle in a consumer.

By way of example, embodiments of the invention may be used to develop foodstuffs that have a low $T_{max}$ value (fast absorbing) which is aimed at treating post-prandial or post-exercise oxidative stress and inflammation cycles. Alternatively/additionally, embodiments of the invention may be used to develop foodstuffs that have a high $T_{max}$ value (slow absorbing) which may be aimed at treating chronic inflammation and oxidative stress associated with chronic diseases. In addition, repeat dosing of fast-absorbing plant extracts may be used to achieve steady state levels in plasma for treating chronic inflammation. Embodiments of the invention enable foodstuffs to be developed which are enriched to intentionally divert metabolites to the gut by preferentially selecting plant extracts having metabolites with delayed absorption properties for inclusion in the optimised formulation. Superior health benefits may be obtained by optimising the formulation of the foodstuff for either fast (low $T_{max}$) or slow (high $T_{max}$) absorption, or a combination of these. This can also help manage the risk of chronic disease. Additionally the present invention may exploit the interaction with other constituents such as fibre, to facilitate transport to the lower intestine.

Embodiments of the invention may also be used to evaluate e.g. plant based or other diets by characterising the absorption time or time profile of plant metabolites in those diets. The characterised absorption time information may then be used to enrich optimised foodstuffs to mimic the activity (and perceived health benefits) from particular diets such as the Mediterranean diet. Similarly, embodiments of the invention may be used to evaluate medicinal plants or alternative plant-based therapies, by characterising the absorption time or time profile of metabolites in those plants. This may in turn inform the formulation of foodstuffs optimised to mimic or utilise the time rate of absorption determined from the plant based therapies.

Persons skilled in the art would appreciate that embodiments of the present invention may be used in the manufacture or production of products such as a meal accompaniment or dietary supplement for consumption post-exercise (or post-prandially) which includes the optimised foodstuff. Similarly, ingredients for foods may incorporate foodstuffs optimised according to embodiments of the invention, as may other supplements, ingredients or consumables for short or longer term use.

Throughout this specification, the term "metabolite" has been used to designate any a bioactive compound present in a plant extract. It will be appreciated by persons skilled in the art however, that embodiments of the present invention may also have applicability across a range of bioactives not derived from plant extracts. These may include e.g. compounds that are synthesised in a laboratory or extracted from naturally occurring or artificial digestible compositions including proteins, spores, fungi and the like.

It is to be understood that the term "plant extract" is not to be limited to extracts contained from naturally occurring plant matter. Plant extracts include (but are not limited to) natural and synthetic plant extracts, synthetic polyphenolics and plant extracts that have been transformed into another state or otherwise modified during processing, cooking, stabilisation or the like.

It will be appreciated by persons skilled in the art that the term "foodstuff" is to be taken as including, without limitation, one or more digestible items such as a food, beverage, condiment, ingredient or supplement product (such as capsules, caplets, tablets, liquids, powders, pastes etc.). The foodstuff may consist of substantially pure plant extracts or plant extract material, or it may include other digestible components such as proteins, carbohydrates, fats and/or fibres.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

The present invention may be used to formulate optimised foodstuffs enriched with strategic combinations of plant metabolites (phenolics, polyphenolic compounds and metabolites with non-phenolic structures) maximising the benefits that can be obtained from eating plant based foods. By using the invention to substantially match the inflammation cycle with the absorption profile of the dietary anti-inflammatory plant metabolites in the enriched foodstuff, tissue damage caused by inflammatory mediators may be minimised. The present invention enables phytochemical content in foodstuffs to be optimised and 'tailor-made' to offer personalized dietary tools for health using the inventive techniques for selection that are based on measurable physicochemical properties, and may also take account of food processing and formulation approaches. Personalized nutritional products formulated according to methods of the present invention may be utilised by healthy individuals to mitigate inflammatory cycles experienced in day to day life e.g. following meals and exercise, and by high disease-risk individuals or cohorts of individuals.

It is to be understood that various modifications, additions and/or alterations may be made to the parts previously described without departing from the ambit of the present invention as defined in the claims appended hereto.

Examples illustrating applications of embodiments of the invention will now be described. These are supplied to provide context and explain features and advantages of the invention and are not limiting on the scope of the invention as defined in the claims.

Example 1: Estimating Rate of Absorption for a Selection of Plant Extracts

Plant extracts were released from beetroot (P0423), broccoli (P0301), spinach (P0383) and rainbow silverbeet (P0407) using food-compatible or other appropriate extraction methods. These were size fractionated to obtain the desired plant extract proportion, i.e. to limit to metabolites having M<1,000 Da. Log P characteristics were determined for the metabolites contained within the extract using HPLC or other suitable methodology. It is to be noted that size fractionation and determination of Log P characteristics of the metabolites was required only for liquid matrices, where (according to Table 1) molecular size has a significant influence on values of $T_{max}$ calculated using the mathematical model. Otherwise, for semi-solid and solid matrices, molecular mass is not a significant parameter in the model. See FIGS. 7A and 7B discussed above.

Figure 10:
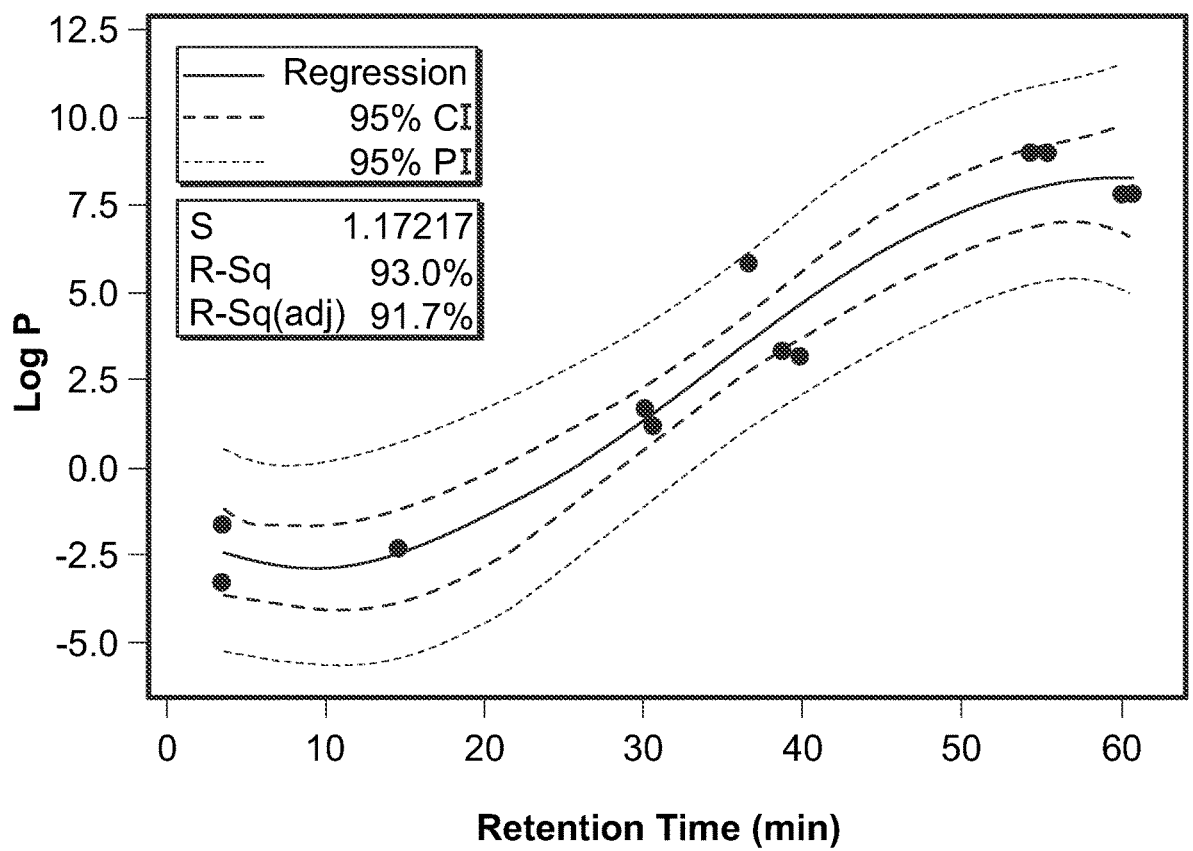
FIG. 10 is a retention curve used to determine retention times for estimating target values of Log P according to Equation 5.

FIGS. 9A to 9D plot Log P values for the specific plant extracts after size fractionation into two groups: <1,000 Da and >1,000 Da. "Total" or "Whole" Extract refers to Log P values of the extract without fractionation and these values are suitable for use in estimating $T_{max}$ using the mathematical model in Equation 3 for semi-solid and solid matrix formats. A calibration curve (FIG. 10) representing the relationship between retention time in mins and Log P for a number of known compounds from previous studies was used to identify from the retention times (RT) the target values of Log P. The line of best fit (regression) in FIG. 10 is represented by Equation 5.

$$\text{Log } P = -0.000173RT^3 + 0.01768RT^2 - 0.2717 RT - 1.676 \quad \text{(Equation 5)}$$

Figure 11:
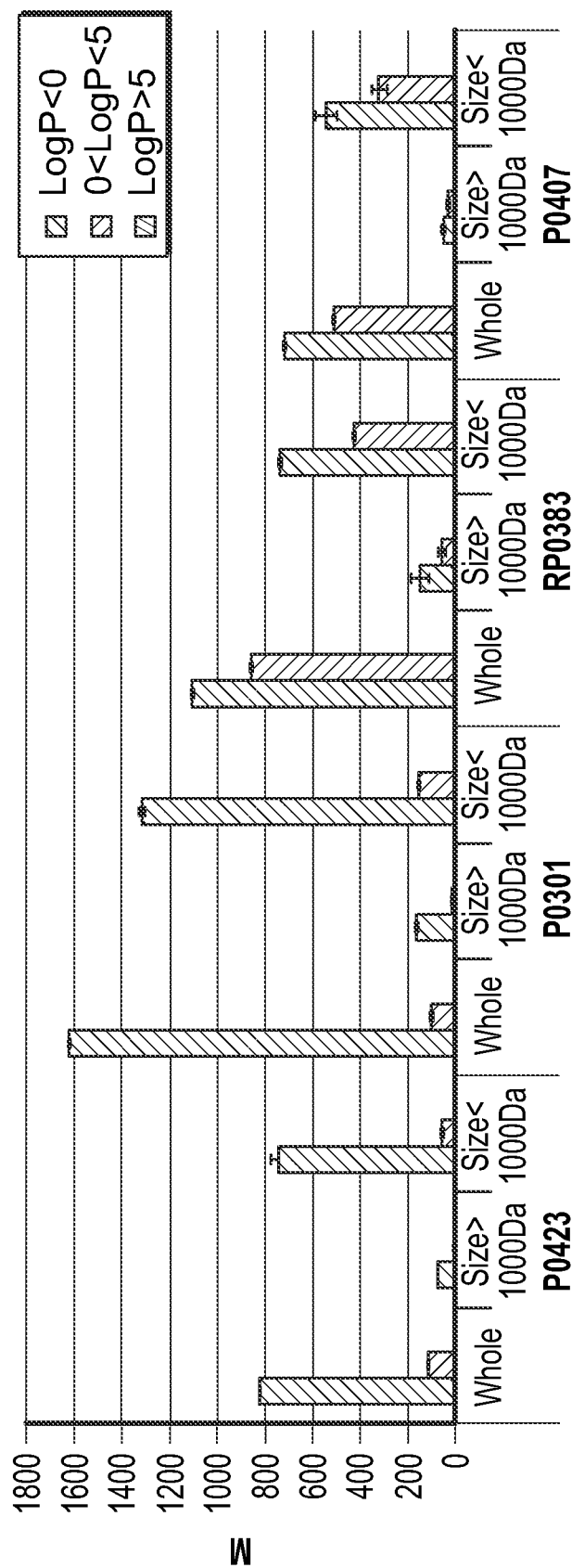
FIG. 11 is a graphical representation of the peak areas and therefore proportions of extracts that contain metabolites having similar molecular mass and that are in the target Log P ranges for the Example; numerical values are shown in Table 5.

The peak areas were calculated for each of the target Log P ranges in FIGS. 9A to 9D. These values are represented graphically in FIG. 11 and numerically in Table 4. Tables 3A, 3B and 3C represent the ranges of $T_{max}$ (hours) calculated using the mathematical model in Equation 3 for metabolites in extracts considered in the Example when consumed in the liquid, semi-solid and solid state, respectively.

It has been observed that in the examples provided, for liquid matrix intake hot water and sonication extraction methods favour metabolites with Log P<0. Solvent or other extraction methods e.g. supercritical extraction) is required to extract metabolites with Log P>5. For the mathematical model in Equation 3 as it applies to the liquid matrix (such as in juice), the most naturally abundant plant metabolites favour fast absorption (i.e. $T_{max}$ less than 3.1 hr, see Table 3A). Only less naturally abundant plant metabolites favour longer absorption times (i.e. $T_{max}$ of 2.6 to 6.5 hr) that might accompany digestion processes and exert protection against oxidative stress, and require size fractionation for enrichment of foodstuffs made according to methods of the present invention.

Figure 13:
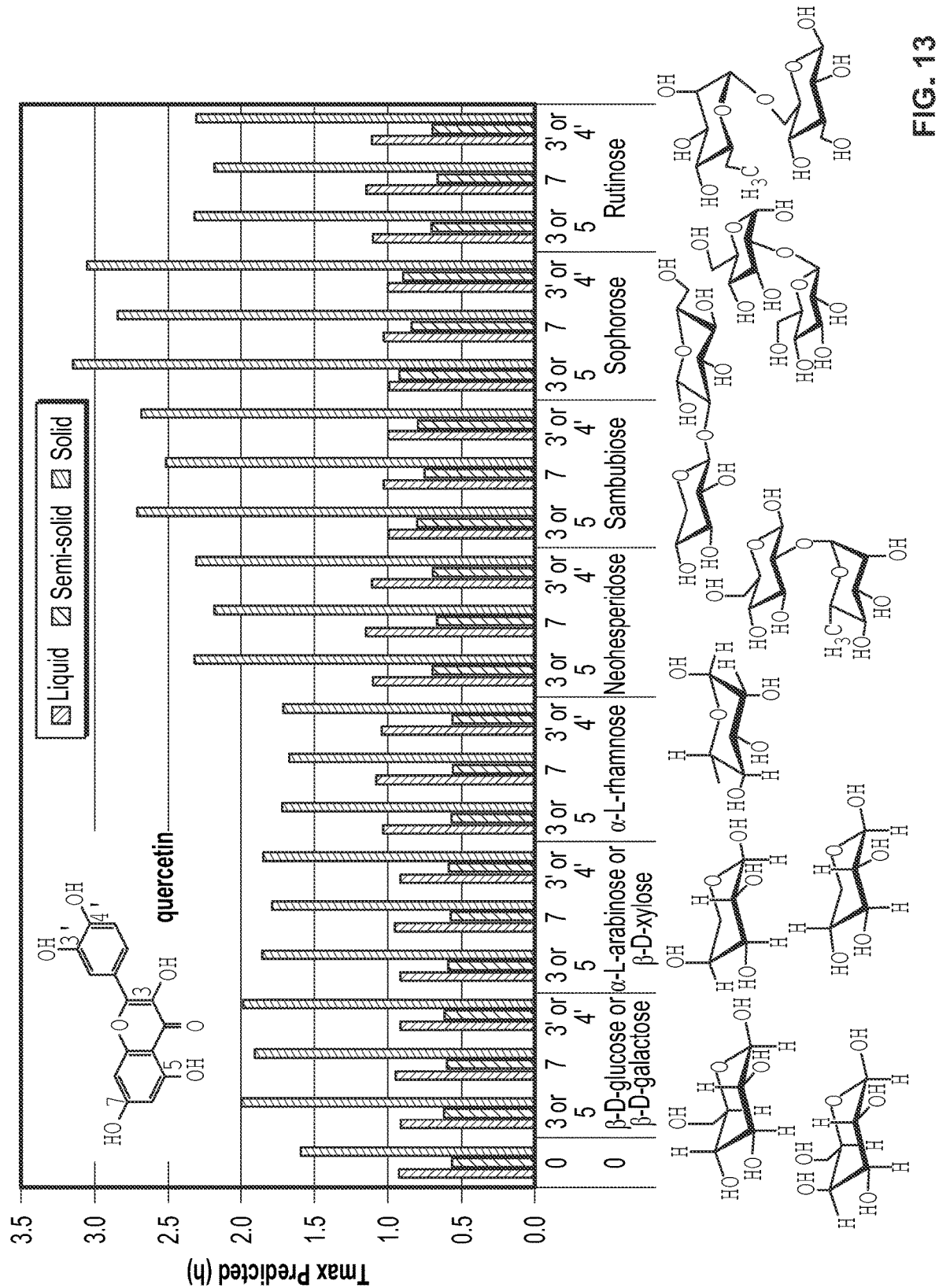
FIG. 13 shows values of $T_{max}$ calculated according to an embodiment of the invention for the model flavonol quercetin, having sugar moiety substitutions at each one of 5 possible positions.

Example 2: Estimating Rate of Absorption to Predict Effect of Sugar Substitution on Absorption of Polyphenolic Phytochemicals Phytochemicals of phenolic classes frequently contain glycoside linkages as a result of post-translational processing. Sugar attachment serves the biological purpose of increasing molecular polarity and capacity for storage in plant cell vacuoles. In the context of human consumption, it would be useful to predict how rate of absorption is likely to be influenced by sugar substitution. An embodiment of the present invention was used to calculate an estimated rate of absorption ($T_{max}$) for a range of hypothetical glycosides of the flavonoid 'quercetin', by substitution of common mono- and di-saccharides. FIG. 13 shows values of $T_{max}$ calculated using the inventive method as a function of sugar moiety substitutions at each of 5 possible positions on the model flavonol, quercetin. Effects on $T_{max}$ for solid, semi-solid and liquid intake options are shown. The model predicted small effects on $T_{max}$ for different sugars and different sites of substitution, for liquid and semi-solid intakes of phytochemicals. However, for solid intake form (e.g., supplement) $T_{max}$ displayed up to 2-fold longer times particularly for disaccharide substitutions. This demonstrates the potential for genetic modification or process-based methods, e.g., fermentation, to modulate $T_{max}$ by the addition or removal of sugars. Substitution of sugars at multiple sites is expected to further extend the dynamic range of predicted $T_{max}$.

Figure 14A:
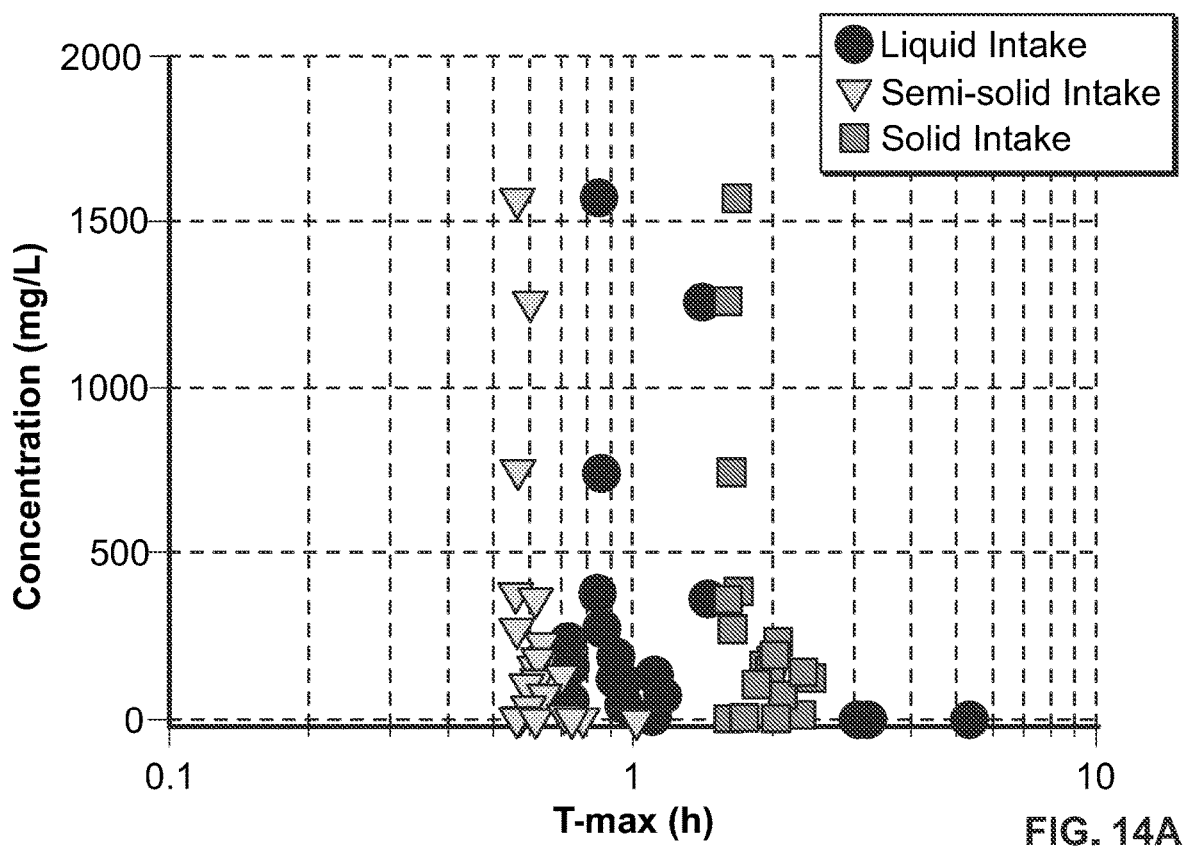
FIGS. 14A and 14B show $T_{max}$ for green tea and black tea respectively, as a function of intake in either liquid, semi-solid or solid forms.
Figure 14B:
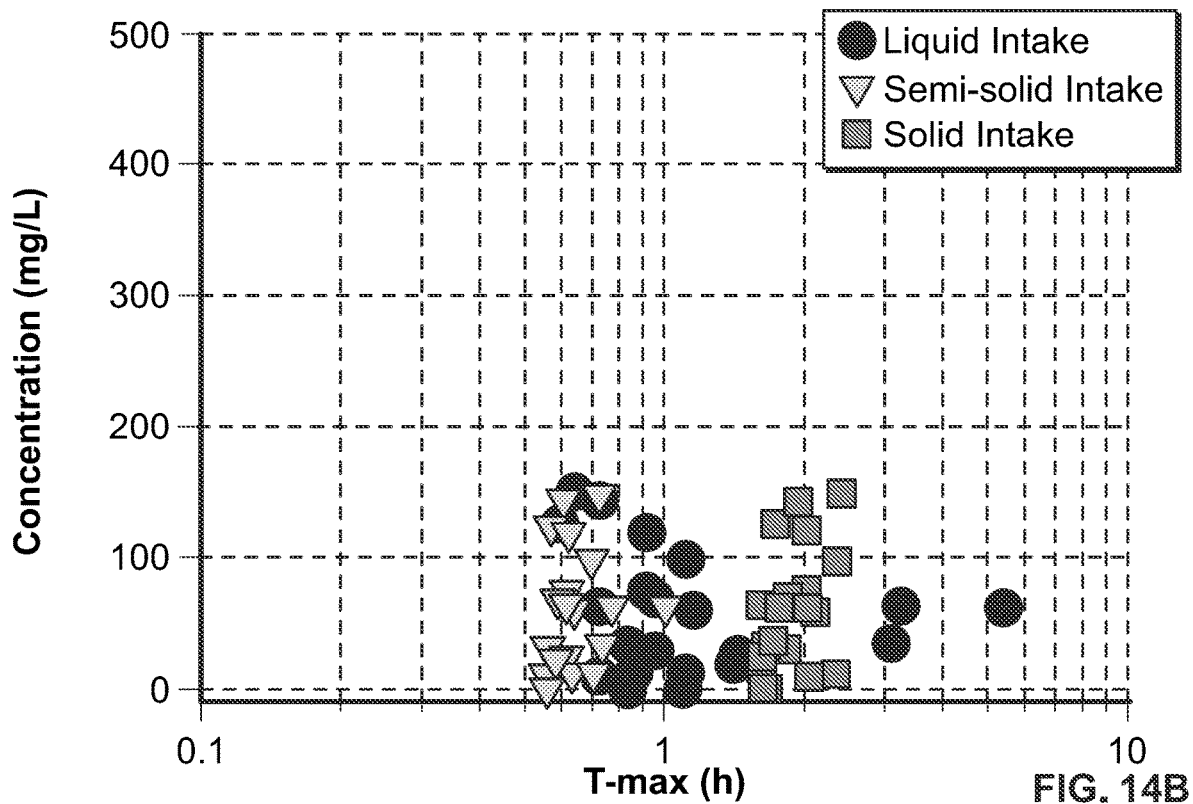

Example 3: Estimating Rate of Absorption to Predict Effect of Enzymatic Oxidation on Absorption of Tea Polyphenolics in Black Versus Green Tea An embodiment of the present invention was used to calculate an estimated rate of absorption ($T_{max}$) for a range of tea phytochemicals according to reported compositional profiles (Del Rio et al., 2004). FIG. 14A shows $T_{max}$ for green tea and FIG. 14B shows $T_{max}$ for black tea, as a function of intake in either liquid, semi-solid or solid forms. The results predict significant differences in relative abundance of species with different ranges of $T_{max}$ between green and black teas as a result of the extensive oxidative enzymatic processing of black tea (FIG. 14B). The natural abundance of phytochemicals in green tea were 5-10-fold higher. $T_{max}$ was lengthened from 1 to 2 hrs by solid intake form, as relevant to the use of tea phenolics in supplement form. Significantly, a small number of highly oxidised products in black tea, and likely to be underestimated here because of the complex structures which have not all been identified, displayed $T_{max}$ values of 2-5 hr indicating potential 'slow release' absorption properties of components of black tea, not present in green tea. The slow-absorption properties of black tea are expected to favour gut-microbiome-mediated digestion. These differences provide for strategic exploitation of black tea versus green tea polyphenolics in specific applications.

Figure 15A:
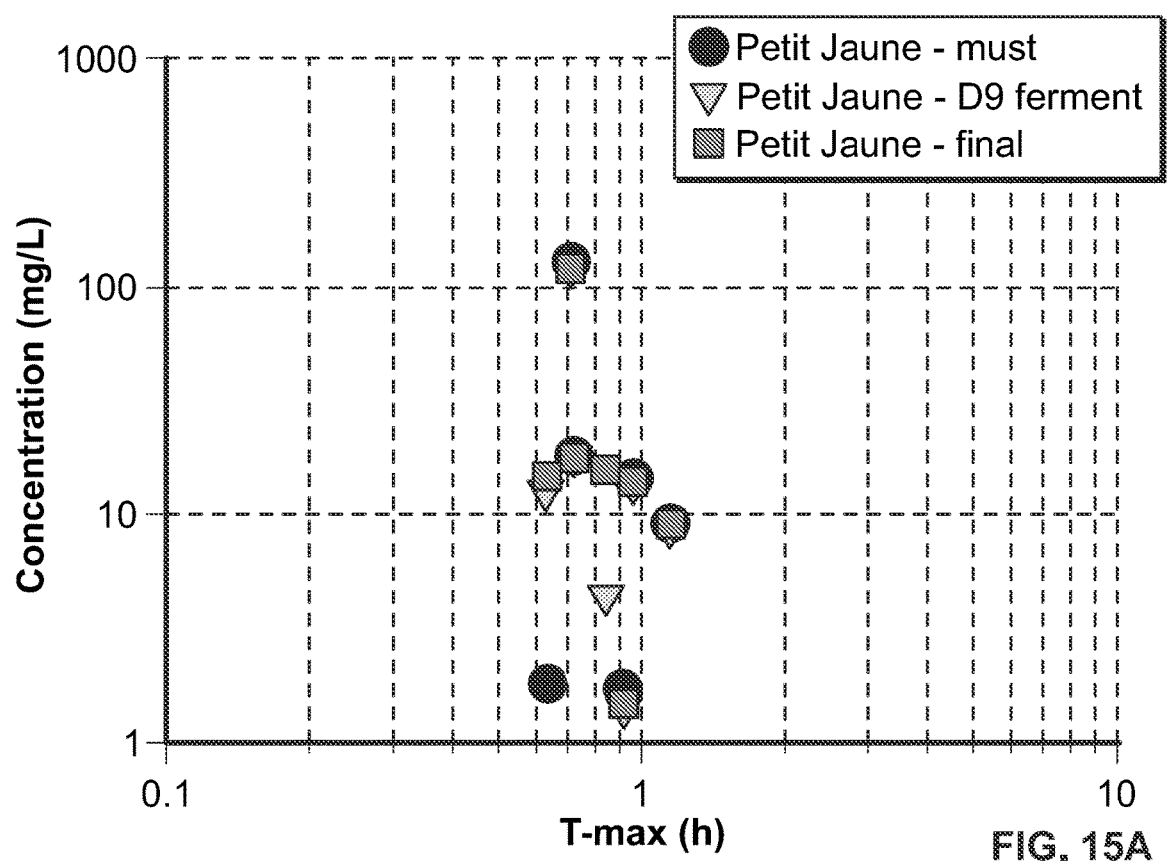
FIGS. 15A and 15B show phytochemicals present in apple must and at mid and final stages of apple cider fermentation for Petit Jaune and for Kermerrien apple varieties respectively.
Figure 15B:
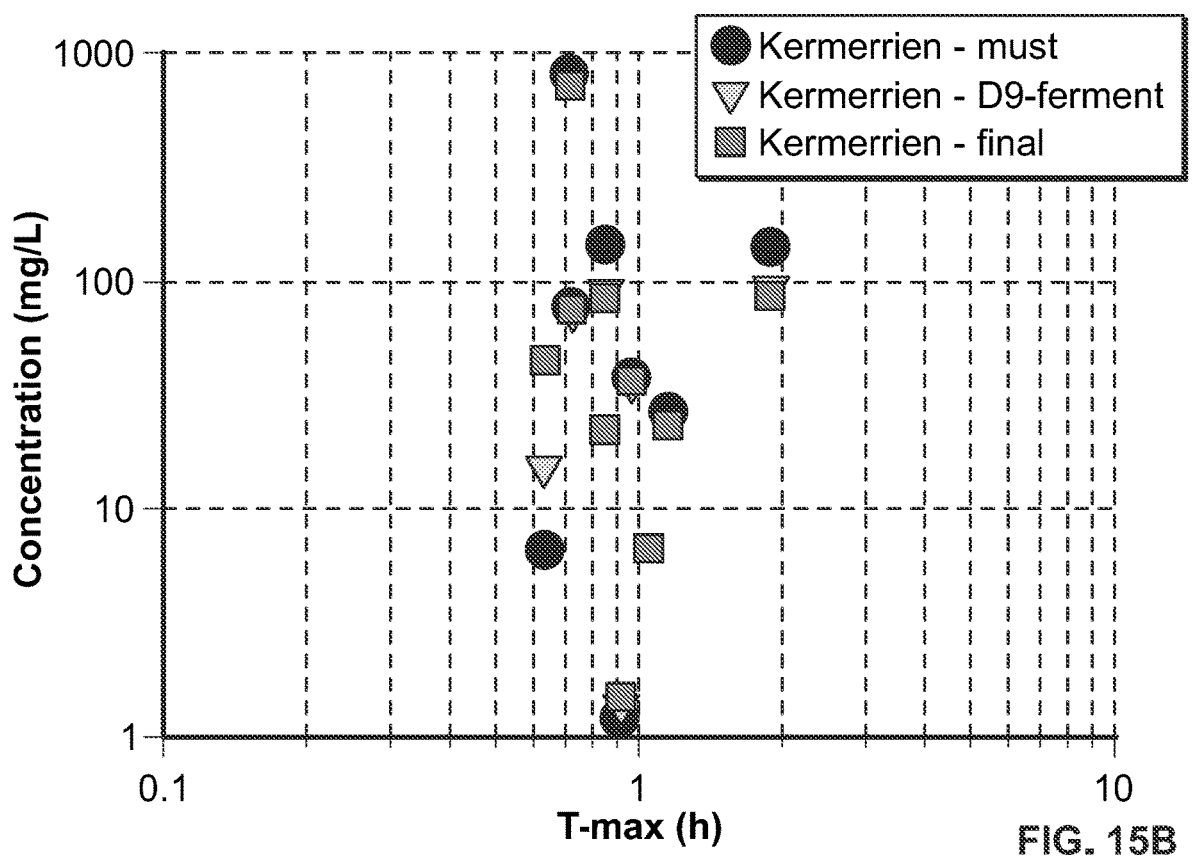

Example 4: Estimating Rate of Absorption to Predict Effect of Enzymatic Oxidation and Fermentation on Absorption of Phytochemicals in Processed Apple Cider An embodiment of the present invention was used to estimate rate of absorption ($T_{max}$) for phytochemicals in 2 varieties of apple at progressive stages of fermentation into cider according to data reported by (Nogueira et al., 2008). Phytochemicals present in apple must and at mid (Day 9) and final stages of fermentation are shown in FIG. 15A for Petit Jaune apple varieties and in FIG. 15B for Kermerrien apple varieties. Results are shown for liquid intake only. Natural abundance and predicted $T_{max}$ properties of phytochemicals were strongly dependent on apple variety with higher concentrations and range of $T_{max}$ evident in Kermerrien (FIG. 15B) versus Petit Jaune (FIG. 15A) varieties. Finished ciders of Kermerrien apples contained up to 10-fold higher concentrations of phenolics and with broader ranges of $T_{max}$. Specific phytochemicals were altered by fermentation processing, either consumed or produced and suggest that the apple variety is the primary driver of phytochemical abundance in ciders.

Figure 16:
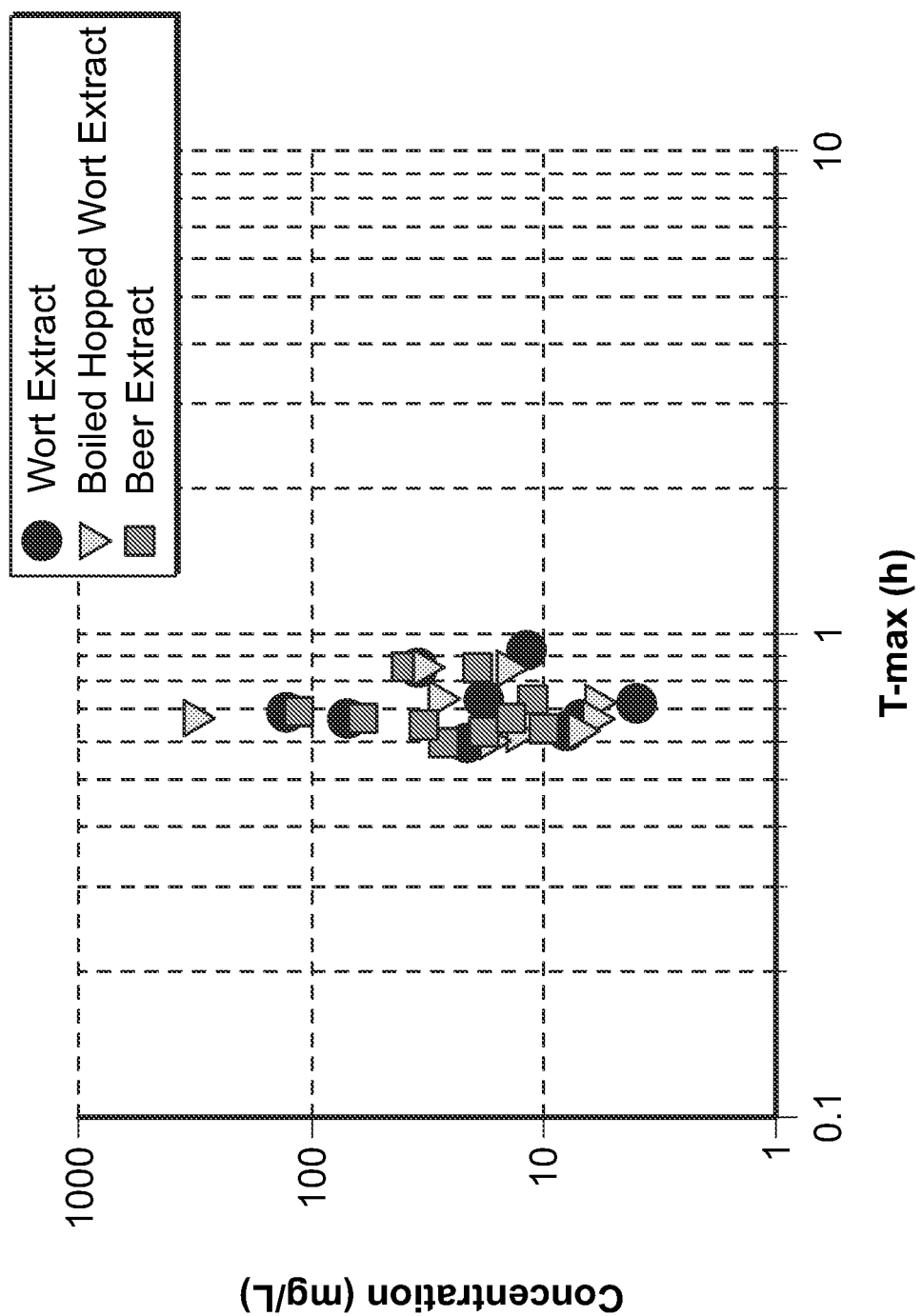
FIG. 16 shows phytochemicals present at selected stages of beer fermentation.

Example 5: Estimating Rate of Absorption to Predict Effect of Grain Germination and Fermentation in Beer Processing on Absorption of Phytochemicals in Beer An embodiment of the present invention was used to calculate an estimated rate of absorption ($T_{max}$) for phytochemicals in beer at progressive stages of fermentation according to data reported by (Leitao et al., 2011). FIG. 16 shows phytochemicals present at selected stages of beer fermentation. Results are shown for liquid intake only. The envelope of phytochemicals and calculated $T_{max}$ values were relatively unchanged by processing although some of the phenolics introduced from the hops were lost in the final product. Beer phytochemicals displayed very short Tmax predicting fast absorption (<1 h) for consumption in liquid form. Advantageously, this may counterbalance adverse oxidative stress accompanying glycemic properties associated with beer carbohydrates.

The claims defining the invention are as follows:

1. An apparatus for producing a foodstuff enriched with plant extracts containing one or more plant metabolites, the apparatus including:
   (a) a controller having a user interface for receiving a target absorption time for the foodstuff being produced;
   (b) a plurality of storage chambers, each containing a plant extract and having an outflow opening operable by the controller to release a quantity of the plant extract for mixing;
   (c) a blending chamber configured to receive the plant extracts released from the storage chambers and having a mixer operable by the controller to mix the received plant extracts; and
   (d) a processing unit for processing the mixed plant extracts into a format suitable for consumption or packaging as a foodstuff;
   wherein the controller is in operative communication with a database containing physicochemical data for the plant metabolites and with a memory storing a mathematical model, which uses the physicochemical data to determine a time or time period ($T_{max}$) at which at least one of the plant metabolites in one or more of the plant extracts reaches a maximum concentration in plasma, the physicochemical data including molecular mass (M) and at least one of liphophilicity (log P) and Polar Surface Area (PSA), wherein the controller is configured to:
      (i) calculate $T_{max}$ by applying the physicochemical data to the stored mathematical model, wherein the stored mathematical model utilizes at least M and at least one of log P and PSA to calculate $T_{max}$;
      (ii) identify the plant metabolites for which the calculated $T_{max}$ corresponds with the target absorption time for the foodstuff; and
      (iii) generate an optimised formulation for the foodstuff comprising quantities of the plant extracts that contain the identified plant metabolites in proportions required to satisfy the target absorption time.

2. The apparatus according to claim 1, wherein the plant extract proportion of the optimised formulation is comprised of identified metabolites sharing similarity in at least one physicochemical property.

3. The apparatus according to claim 1, wherein the model further comprises a matrix type representing an intended composition of the foodstuff for consumption, wherein user interface is configured to receive the matrix types selected from a group including one or more of solid, semi-solid and liquid.

4. The apparatus according to claim 1, wherein the target absorption time is a time range.

5. The apparatus according to claim 1, wherein the calculated $T_{max}$ comprises a time range during which concentration in plasma of the plant metabolites is estimated to be highest.

6. The apparatus according to claim 1, wherein the physicochemical data comprises one or more ranges of data values.

7. The apparatus according to claim 3, wherein the mathematical model further comprises one or more parameters that adapt the mathematical model according to the matrix type.

8. The apparatus according to claim 7, wherein the one or more parameters are selected from a group including:
   (a) parameters for use when the physicochemical data includes PSA; and
   (b) parameters for use when the physicochemical data includes log P.

9. The apparatus according to claim 8, wherein the physicochemical data includes log P and the mathematical model is:

$$\ln(T_{max}) = \mu + \beta \log P + \gamma (\log P)^2 + \alpha M$$

where $\mu$, $\beta$, $\gamma$ and $\alpha$ are parameters of the mathematical model estimated using experimental data.

10. The apparatus according to claim 9, wherein the parameters $\mu$, $\beta$, $\gamma$ and $\alpha$ are weighted according to the matrix type, according to the following values:

| i | $\mu_i$ | $\beta_i$ | $\gamma_i$ | $\alpha_i$ |
|---|---|---|---|---|
| Liquid | −0.966 | 0.155 | 0.008 | 0.002 |
| Middle | −0.524 | −0.107 | 0.047 | 0 |
| Solid | 0.629 | −0.161 | 0.038 | 0. |

11. The apparatus according to claim 8, wherein the physicochemical data includes PSA and M and the mathematical model is:

$$\ln(T_{max}) = \mu + \beta PSA + \gamma M$$

where $\mu$, $\beta$ and $\gamma$ are parameters of the mathematical model estimated using experimental data.

12. The apparatus according to claim 11, wherein the parameters $\mu$, $\beta$ and $\gamma$ are weighted according to the matrix type, according to the following values:

| i | $\mu_i$ | $\beta_i$ | $\gamma_i$ |
|---|---|---|---|
| Liquid | −0.959 | −0.009 | 0.007 |
| Middle | −1.831 | −0.011 | 0.009 |
| Solid | 0.590 | −0.007 | 0.004. |

13. The apparatus according to claim 1, wherein the storage chambers include storage chambers containing plant extracts in liquid format and storage chambers containing plant extracts in solid format.

14. The apparatus according to claim 1, further including one or more storage chambers containing carrier substances used by the processing unit to process the mixed extracts into a format for packaging, wherein the format is selected from a group including powder, solid, pill, capsule, gel, paste, and liquid.

15. The apparatus according to claim 1, wherein the model further comprises one or more of foodstuff format, taste, texture, price and colour.

16. The apparatus according to claim 1, further including a packaging unit for packaging the processed foodstuff.

17. The apparatus according to claim 1, wherein the target absorption time represents a specific time or time range after ingestion of the foodstuff.

* * * * *